(12) United States Patent
Kim et al.

(10) Patent No.: US 10,903,570 B2
(45) Date of Patent: Jan. 26, 2021

(54) APPARATUS AND METHOD FOR MATCHING ANTENNA IMPEDANCE IN WIRELESS COMMUNICATION SYSTEM

(71) Applicant: SAMSUNG ELECTRONICS CO., LTD., Suwon-si (KR)

(72) Inventors: Dae-Young Kim, Seoul (KR); Dong-Hyun Kang, Seoul (KR); In-Tae Kang, Seoul (KR); Jong-Han Lim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 507 days.

(21) Appl. No.: 15/438,099

(22) Filed: Feb. 21, 2017

(65) Prior Publication Data

US 2018/0026369 A1  Jan. 25, 2018

(30) Foreign Application Priority Data

Jul. 22, 2016 (KR) .................. 10-2016-0093720

(51) Int. Cl.
*H04B 17/12* (2015.01)
*H01Q 5/335* (2015.01)
*H04W 52/36* (2009.01)

(52) U.S. Cl.
CPC ............. *H01Q 5/335* (2015.01); *H04B 17/12* (2015.01); *H04W 52/367* (2013.01)

(58) Field of Classification Search
CPC .... H04B 1/02; H04B 1/04; H04B 2100/0408; H04B 2100/0416; H04B 2100/0433; H04B 17/101; H04B 17/12; H04B 17/13; H01Q 5/335; H01Q 5/364
See application file for complete search history.

(56) References Cited

U.S. PATENT DOCUMENTS

| | | | |
|---|---|---|---|
| 8,395,459 B2* | 3/2013 | Spears ................. | H04B 1/0458 333/17.3 |
| 2010/0073103 A1* | 3/2010 | Spears ................. | H04B 1/0458 333/17.3 |
| 2014/0327594 A1 | 11/2014 | Zhang et al. | |
| 2014/0354173 A1 | 12/2014 | Matsuno | |
| 2015/0048898 A1 | 2/2015 | Gaynor | |
| 2015/0244341 A1 | 8/2015 | Ritter et al. | |
| 2015/0288348 A1 | 10/2015 | Mason | |
| 2015/0288400 A1 | 10/2015 | Nguyen et al. | |
| 2015/0349465 A1 | 12/2015 | Cornelius et al. | |
| 2016/0020814 A1* | 1/2016 | Wang ....................... | H04B 1/40 455/77 |
| 2017/0264010 A1* | 9/2017 | Shi ........................ | H04B 1/0458 |
| 2017/0346178 A1* | 11/2017 | Shi ........................ | H04B 17/102 |

* cited by examiner

*Primary Examiner* — Thanh C Le
(74) *Attorney, Agent, or Firm* — Sughrue Mion, PLLC

(57) ABSTRACT

Provided is a method for matching antenna impedance in a wireless communication system. The method includes determining an approximate reflection coefficient based on an input signal and an output signal of a bidirectional coupler connected to a signal path of an antenna; determining an antenna impedance matching parameter corresponding to the determined approximate reflection coefficient by using a lookup table; and performing antenna impedance matching based on the antenna impedance matching parameter.

16 Claims, 19 Drawing Sheets

APPARATUS AND METHOD FOR MATCHING ANTENNA IMPEDANCE IN WIRELESS COMMUNICATION SYSTEM

CROSS-REFERENCE TO RELATED APPLICATION(S)

This application claims priority from Korean Patent Application No. 10-2016-0093720, filed in the Korean Intellectual Property Office, on Jul. 22, 2016, the entire disclosure of which is incorporated herein by reference.

TECHNICAL FIELD

Apparatuses and methods consistent with exemplary embodiments relate to matching antenna impedance in a wireless communication system.

BACKGROUND

In a wireless communication system, the transmission efficiency of an antenna may be affected by the input impedance of the antenna. Accordingly, in general, a transmitter performs impedance matching so that a reflection coefficient in a transmission antenna port may be minimized. Impedance matching refers to an operation in which a load impedance that varies in a process of installing the antenna in a terminal or varies depending on various radio environments and the use environment of the terminal is matched to the characteristic impedance so that the maximum power transfer to the antenna may be achieved.

The related art fixed-impedance matching circuit performs antenna impedance matching in advance based on a characteristic impedance value (e.g., 50 ohm or 75 ohm) to avoid reflection losses by matching impedances of both sides at an in-between contact point so that all of the power supplied from a signal source may be transferred to the load.

The related art fixed-impedance matching circuit may be designed such that the antenna impedance matching network is relatively simple in configuration, and does not occupy the large area.

However, in the related art fixed-impedance matching circuit, its impedance matching range is limited, and in particular, when the load impedance is changed due to various reasons, the antenna impedance matching is difficult to perform. A corresponding S-parameter (or Scattering-matrix) is provided by the vender. The S-parameter refers to a ratio of an output voltage to an input voltage seen at each port of the circuit processing a radio frequency (RF) signal, and by using the S-parameter, an RF circuit may perform impedance matching to minimize the reflection losses. However, in the actual circuit, because it is difficult for every terminal to extract the S-parameter, there is no effective impedance matching scheme for the communication environments that vary with respect to each terminal.

Meanwhile, in a wireless communication system, there is a death grip phenomenon in which the transmission and/or reception sensitivity of the radio waves is abruptly lowered in the situation where the load impedance of the terminal varies. Here, the death grip may occur, for example, when the user's hand is in contact with the conductive frame of the terminal, or wraps around the antenna-embedded part of the terminal. When the death grip phenomenon occurs, the performance degradation may occur since the frequency shift and loss increase due to the contact between the user's body and the conductive frame or the antenna being covered by the user's hand.

There is a need for a scheme capable of preventing occurrence of the death grip phenomenon and improving the transmission and/or reception performance.

SUMMARY

One or more exemplary embodiments provide a method and apparatus capable of increasing the efficiency of transmission power of an antenna in a wireless communication system.

Further, one or more exemplary embodiments provide a method and an apparatus capable of increasing the transmission power of an antenna without a complex operation in a wireless communication system.

Moreover, one or more exemplary embodiments provide a method and an apparatus for substantially preventing a death grip phenomenon in which the transmission and/or reception sensitivity of the radio waves is abruptly lowered in the situation where the load impedance of the terminal varies, in a wireless communication system.

In accordance with an aspect of an exemplary embodiment, there is provided a method for matching antenna impedance in a wireless communication system. The method may include determining an approximate reflection coefficient based on an input signal and an output signal of a bidirectional coupler connected to a signal path of an antenna; determining an antenna impedance matching parameter corresponding to the determined approximate reflection coefficient by using a lookup table; and performing antenna impedance matching based on the antenna impedance matching parameter.

In accordance with an aspect of another exemplary embodiment, there is provided an apparatus for matching antenna impedance in a wireless communication system. The apparatus may include a controller configured to determine an approximate reflection coefficient based on an input signal and an output signal of a bidirectional coupler connected to a signal path of an antenna, and determine an antenna impedance matching parameter corresponding to the determined approximate reflection coefficient by using a lookup table; and an antenna impedance matching unit configured to perform antenna impedance matching based on the antenna impedance matching parameter.

In accordance with an aspect of still another exemplary embodiment, there is provided an apparatus for matching antenna impedance in a wireless communication system. The apparatus may include a bidirectional coupler connected to a signal path of an antenna; and a controller configured to determine an approximate reflection coefficient based on output power of the bidirectional coupler in a reverse path and output power of the bidirectional coupler in a forward path of the bidirectional coupler, and perform antenna impedance matching based on the approximate reflection coefficient.

BRIEF DESCRIPTION OF THE DRAWINGS

The above and/or other aspects will be more apparent by describing certain exemplary embodiments with reference to the accompanying drawings, in which.

DETAILED DESCRIPTION

Hereinafter, exemplary embodiments will be described in detail with reference to the accompanying drawings. In the following description, a detailed description of known functions and configurations will be omitted, if it is determined that the description unnecessarily obscures the subject matter of the disclosure. The terms described below are terms defined in consideration of the functions in the disclosure, and may vary depending on the intention of the user/ operator or the customs. Therefore, the definition should be made based on the contents throughout the specification.

Although terms used in the disclosure are selected with general terms popularly used at present under the consideration of functions with respect to the exemplary embodiments, the terms may vary according to the intention of those of ordinary skill in the art, judicial precedents, or introduction of new technology. In addition, in a specific case, the applicant voluntarily may select terms, and in this case, the meaning of the terms is disclosed in a corresponding description part of the disclosure. Thus, the terms used in the disclosure should be defined not by the simple names of the terms but by the meaning of the terms and the contents throughout the disclosure.

A base station is an entity communicating with a terminal, and may refer to a base station (BS), a Node B (NB), an evolved Node B (eNB), access point (AP), and the like.

A terminal (or a communication terminal) is an entity communicating with a base station or another terminal, may refer to a node, a user equipment (UE), a mobile station (MS), a mobile equipment (ME), a device, a terminal, and the like.

Figure 1A:
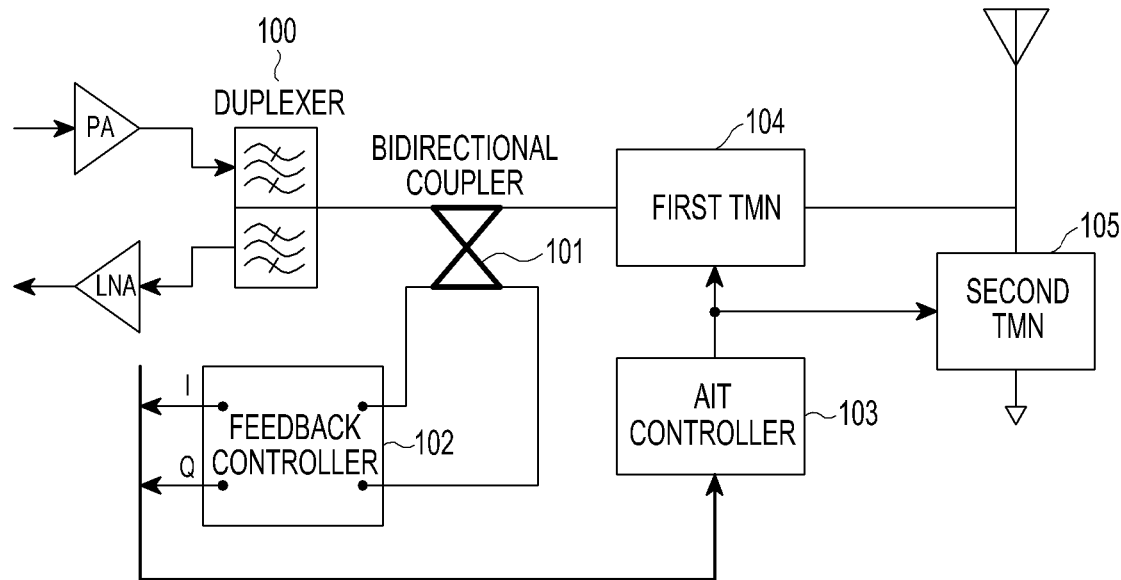
FIGS. 1A, 1B, and 1C are block diagrams of antenna impedance matching devices in a wireless communication system according to exemplary embodiments.
Figure 1B:
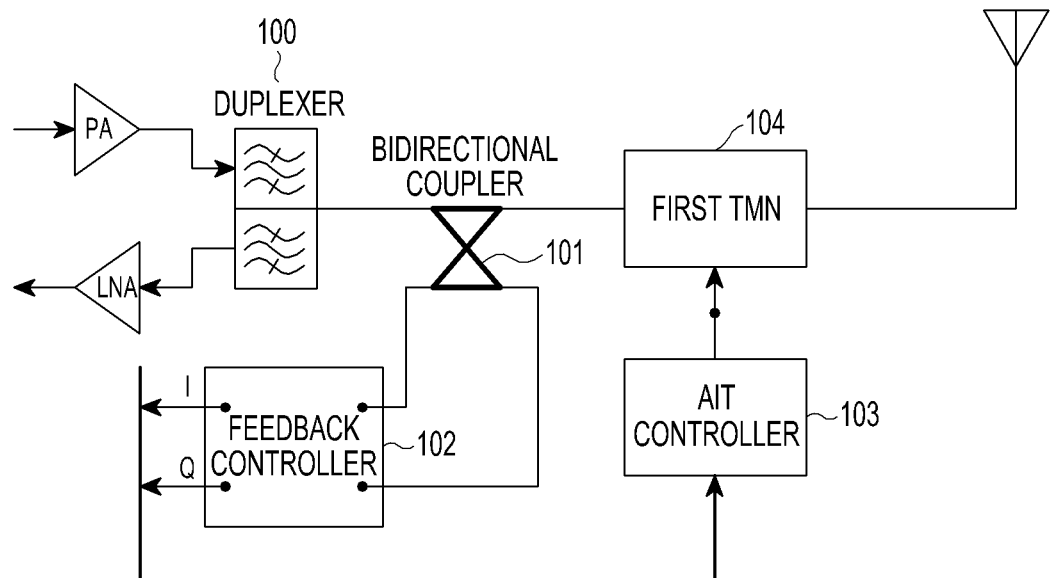
Figure 1C:
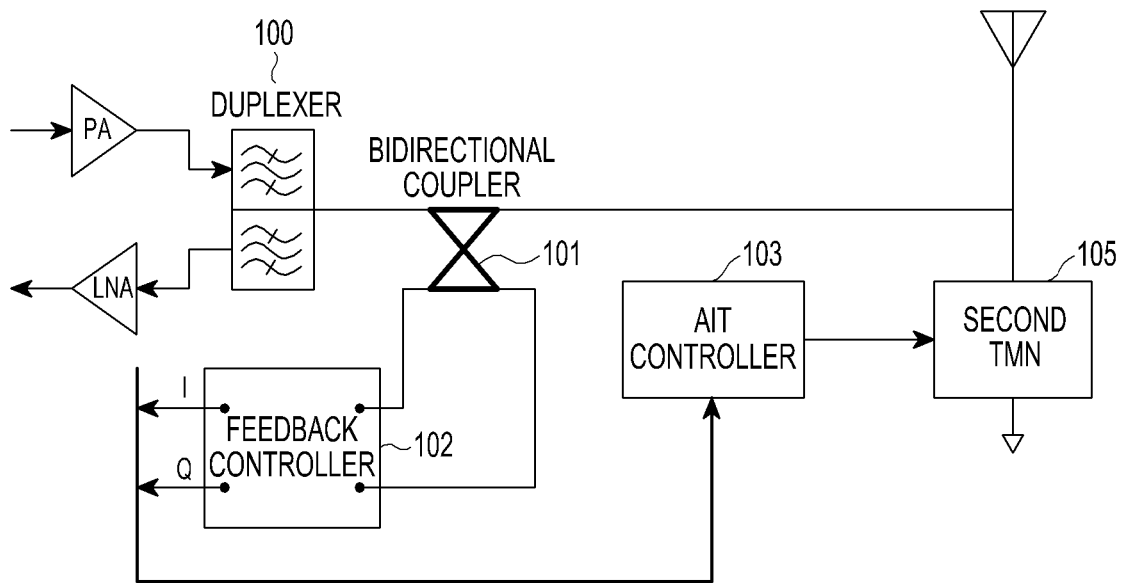

FIGS. 1A, 1B, and 1C are block diagrams of antenna impedance matching apparatuses in a wireless communication system according to exemplary embodiments.

In the wireless communication system, an antenna impedance apparatus according to an exemplary embodiment as shown in FIG. 1A may include an antenna impedance tuning (AIT) controller 103, a first tunable matching network (TMN) 104 and a second TMN 105. The AIT controller 103 may control the TMN 104 and the second TMN 105.

The first TMN 104 represents an impedance tuner, and may efficiently perform (or maximize) power transfer by matching impedance using a TMN parameter via a serial connection.

The second TMN 105 represents an aperture tuner, and may increase (or maximize) the radiation efficiency in a free space by tuning the impedance matching or resonant frequency using the TMN parameter, via a parallel connection.

The AIT controller 103 may perform impedance matching by updating at least one TMN parameter among TMN parameters of the first TMN 104 and the second TMN 105 to adjust a load impedance of an antenna end based on a reflection coefficient (or an approximate reflection coefficient) according to an exemplary embodiment.

In another exemplary embodiment, in the wireless communication system, an antenna impedance matching apparatus as shown in FIG. 1B may include the first TMN 104 and the AIT controller 103 that controls the first TMN 104. In other words, the AIT controller 103 may perform impedance matching by updating the TMN parameter of the first TMN 104.

In still another exemplary embodiment, in the wireless communication system, an antenna impedance matching apparatus as shown in FIG. 1C may include the second TMN 105 and the AIT controller 103 that controls the second TMN 105. In other words, the AIT controller 103 may perform impedance matching by updating the TMN parameter of the second TMN 105.

Accordingly, in exemplary embodiments, the impedance matching may be performed in a manner that the AIT controller 103 updates (or adjusts) the TMN parameter of the first TMN 104 based on the approximate reflection coefficient, updates (or adjusts) the TMN parameter of the second TMN 105 based on the approximate reflection coefficient, and/or updates (or adjusts) the TMN parameters of the first TMN 104 and the second TMN 105 based on the approximate reflection coefficient.

Referring to FIG. 1A, the antenna impedance matching apparatus may include a power amplifier PA, a low noise amplifier LNA, a duplexer 100, a bidirectional coupler 101, a feedback controller 102, the first TMN 104, the AIT controller 103 and the second TMN 105. In the antenna impedance matching apparatus according to an exemplary embodiment, a modem and a radio frequency (RF) unit may be configured in a front end of the power amplifier PA and the low noise amplifier LNA.

The power amplifier PA may amplify a signal converted in the front end to a preset signal level, and transmit the amplified signal to the duplexer 100.

The duplexer 100 may transmit the signal received from the power amplifier PA to the bidirectional coupler 101.

The bidirectional coupler 101 is connected with the feedback controller 102 of the front end including the RF unit, and may distribute signals to two or more ports, and/or gather signals at one port. Further, the bidirectional coupler 101 may perform signaling along a forward path and/or a reverse path by using a feedback loop to perform measurement of the approximate reflection coefficient.

In other words, the bidirectional coupler 101 may transmit the signal transmitted through the antenna, via the feedback path in the forward direction, or transmit a reflected wave of the transmission signal to the feedback controller 102 in the reverse direction.

The feedback controller 102 may detect the received signal that is propagated in the forward path signaling or reverse path signaling, and store the detected signal in a memory (not shown). The signals stored in the memory may be used to approximately estimate the load impedance that is changed through time alignment.

Further, the feedback controller 102 may obtain the approximate reflection coefficient based on the received signal that is propagated in the forward path signaling or reverse path signaling, and transmit the obtained approximate reflection coefficient to the AIT controller 103.

The AIT controller 103 may set a ratio between levels of received signals on the forward path and the reverse path as an approximate reflection coefficient, and control at least one of the first TMN 104 and the second TMN 105 to perform real-time antenna impedance matching based on the approximate reflection coefficient, by using a lookup table. The process of setting the ratio between levels of received signals as the approximate reflection coefficient will be described using Equations (1) to (5) below.

The AIT controller 103 may precisely search the lookup table using the approximate reflection coefficient, and obtain a desirable TMN parameter corresponding to the approximate reflection coefficient through the searched lookup table. The lookup table may be implemented to include TMN parameters that may be used to provide high (or maximum) output power with respect to reference impedance positions that are predefined based on the approximate reflection coefficient.

For example, the lookup tale may be implemented as a table in which TMN parameters corresponding to respective indices of the approximate reflection coefficients are mapped thereto. The approximate reflection coefficients refer to reference load points (e.g., the reference impedance points) that are preset to correspond to a change in load impedance of the antenna end according to an exemplary embodiment. Therefore, when an approximate reflection coefficient is obtained based on the changed load impedance of the antenna end, a TMN parameter corresponding to the approximate reflection coefficient may be determined using the lookup table. Accordingly, it is possible to perform impedance matching using the determined TMN parameter. The TMN parameter represents inductance and capacitance values of, for example, a π network or a T network.

The AIT controller 103, in an exemplary embodiment, may set a region (or a low-matching gain region) having a low-matching gain that is determined in advance based on a load coverage of a previously used TMN, and promptly or immediately move the load belonging to the low-matching gain region to a high (or maximum) output voltage point instead of matching the load to a characteristic impedance.

The AIT controller 103, in an exemplary embodiment, may provide a reference point for selecting an impedance matching gain of a TMN as per a voltage standing wave ratio (VSWR), for comparison with the current impedance level. As a result of the comparison, the AIT controller 103 may promptly or immediately move the load belonging to the low-matching gain region to a desirable output point (e.g., high output voltage point) instead of performing impedance matching. The VSWR refers to a height ratio of a standing wave generated by reflection, and may be used to express the reflection coefficient. VSWR has a value close to 1, when there is substantially no reflection, and is proportional to the amount of reflection.

The AIT controller 103 may set reference impedance by using the lookup table, and compensate load impedance of the antenna end by using TMN parameters mapped to the reference impedance corresponding to the measured impedance (e.g., the approximate reference coefficient).

The AIT controller 103 may set a load using a load pull tuner, and provide a database (DB) in advance using TMN parameters to perform compensation of the set load impedance. Here, the load pull tuner is external equipment to generate desired antenna impedance by connecting with a terminal instead of the antenna, and may apply the desired impedance to the terminal by connecting with the terminal instead of the antenna.

The AIT controller 103 may control to perform real-time antenna impedance matching by activating at least one of the first TMN 104 and the second TMN 105 using the desired TMN parameter. Here, the lookup table stores a result of operation in a memory in advance to reduce the number of operations in the process, and thus facilitates the process by using the stored result.

Figure 2:
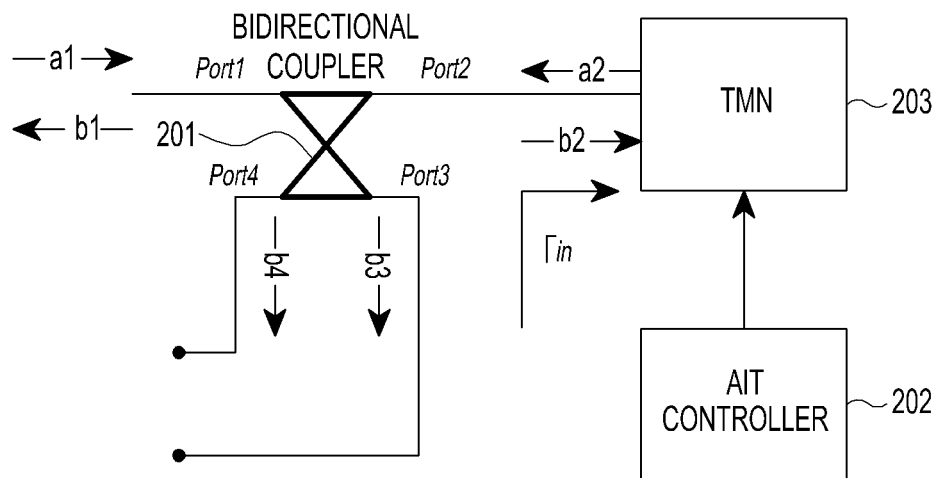
FIG. 2 is a diagram illustrating a detailed structure of a bidirectional coupler in an antenna impedance matching device in a wireless communication system according to an exemplary embodiment.

FIG. 2 is a diagram illustrating a detailed structure of a bidirectional coupler in an antenna impedance matching apparatus in a wireless communication system according to an exemplary embodiment.

The antenna impedance matching apparatus in FIG. 2 may include a bidirectional coupler 201, a TMN 203, and an AIT controller 202. Here, the TMN 203, as shown in FIGS. 1A to 1C, may include at least one of the first TMN 104 and the second TMN 105. The bidirectional coupler 201 corresponds to the bidirectional coupler 101 in FIGS. 1A to 1C.

In FIG. 2, a1, a2, b1, b2, b3, and b4 represent signals according to forward and reverse signal flows, respectively. Here, a1 and a2 represent input signals at respective ports of the bidirectional coupler 201, and b1, b2, b3, and b4 represent output signals at respective ports of the bidirectional coupler 201.

Assuming that outputs of the bidirectional coupler 201 and inputs of the low noise amplifier LNA are properly matched, a 4-port S-parameter is represented as a matrix shown in Equation (1) below.

$$\begin{pmatrix} b_1 \\ b_2 \\ b_3 \\ b_4 \end{pmatrix} = \begin{bmatrix} S_{11} & S_{12} & S_{13} & S_{14} \\ S_{21} & S_{22} & S_{23} & S_{24} \\ S_{31} & S_{32} & S_{33} & S_{34} \\ S_{41} & S_{42} & S_{43} & S_{44} \end{bmatrix} \begin{pmatrix} a_1 \\ a_2 \\ 0 \\ 0 \end{pmatrix} \quad (1)$$

In Equation (1), the S-parameter represents a ratio of output power to input power at each port. For example, $S_{12}$ represents a ratio of output power at a first port Port1 to input power at a second port Port2. Therefore, $S_{11}$, $S_{22}$, $S_{33}$ and $S_{44}$ represent reflection coefficients at respective ports.

Through the matrix in Equation (1), a signal b3 that corresponds to a signal transmitted through the antenna to the feedback controller 102 via the forward path (e.g., along a signal path of a1=>Port1=>Port3=>b3), and a signal b4 that corresponds to a reflected wave of the transmission signal transmitted to the feedback controller 102 via the reverse path (e.g., a signal path of a2=>Port2=>Port4=>b4) may be represented as shown in Equation (2) below.

$$b_3 = S_{31}a_1 + S_{32}a_2 = S_{31}a_1 + S_{32}(b_2 \Gamma_{in})$$

$$b_4 = S_{41}a_1 + S_{42}a_2 = S_{41}a_1 + S_{42}(b_2 \Gamma_{in}) \quad (2)$$

Assuming that the bidirectional coupler 201 is symmetric such as $S_{31} \approx S_{42}$, and has substantially no cross-talk (e.g., $S_{41} = S_{14} \approx 0$, $S_{32} = S_{23} \approx 0$), signal levels of signals b3 and b4 may be approximated as shown in Equation (3) below.

$$b_3 \approx S_{31}a_1$$

$$b_4 \approx S_{42}b_2 \Gamma_{in} = S_{42}(S_{21}a_1)\Gamma_{in} \quad (3)$$

Therefore, a reflection coefficient $\Gamma_{in}$ at the output of the bidirectional coupler 201 may be approximated as shown in Equation (4) below.

$$\Gamma_{in} \approx \frac{b_4}{S_{42}S_{21}(b_3/S_{31})} = \frac{S_{31}b_4}{S_{42}S_{21}b_3} = \frac{b_4}{S_{21}b_3} \quad (4)$$

Herein, b4/b3 may be expressed as shown in Equation (5) below.

$$\frac{b_4}{b_3} \approx S_{21}\Gamma_{in} \quad (5)$$

Because a linear gain $S_{21}$ of the bidirectional coupler 201 is a constant with respect to a fixed carrier frequency, b4/b3 may be an approximate reflection coefficient as per the load change according to an exemplary embodiment. Further, b4/b3 may be measured as a ratio of the output of the bidirectional coupler 201 in the reverse path to the output of the bidirectional coupler 201 in the forward path through the feedback path as shown in Equation (6) below.

$$\frac{b_4}{b_3} = \frac{|s_{fwd,tx}(t)|^2}{|s_{rev,tx}(t)|^2} \frac{\max_{\tau \in D}(s_{rev,tx}(t) \otimes s_{rev,rx}(t+\tau))}{\max_{\tau \in D}(s_{fwd,tx}(t) \otimes s_{fwd,rx}(t+\tau))} \quad (6)$$

In Equation (6), among the subscripts of each signal s(t), "fwd" represents passing through the forward branch of the bidirectional coupler 201, and "rev" represents passing through the reverse branch of the bidirectional coupler 201. Further, "tx" represents a transmitted complex baseband signal and "rx" represents a received complex baseband signal.

As described above, the b4/b3 value calculated through the measurement may be one-to-one mapped to the reflection coefficient $\Gamma_{in}$. Further, the approximate reflection coefficient (e.g., b4/b3) that is one-to-one mapped to the reflection coefficient $\Gamma_{in}$ according to an exemplary embodiment may also be determined through the experiment results in FIGS. 5 and 6 described below. Herein, it should be noted that b4/b3 (or b4/b3 value) and a b4/b3 matrix are interchangeably used.

Therefore, the antenna impedance matching apparatus according to an exemplary embodiment may perform lookup table (LUT)-based real-time antenna impedance matching using the approximate reflection coefficient.

Figure 3:
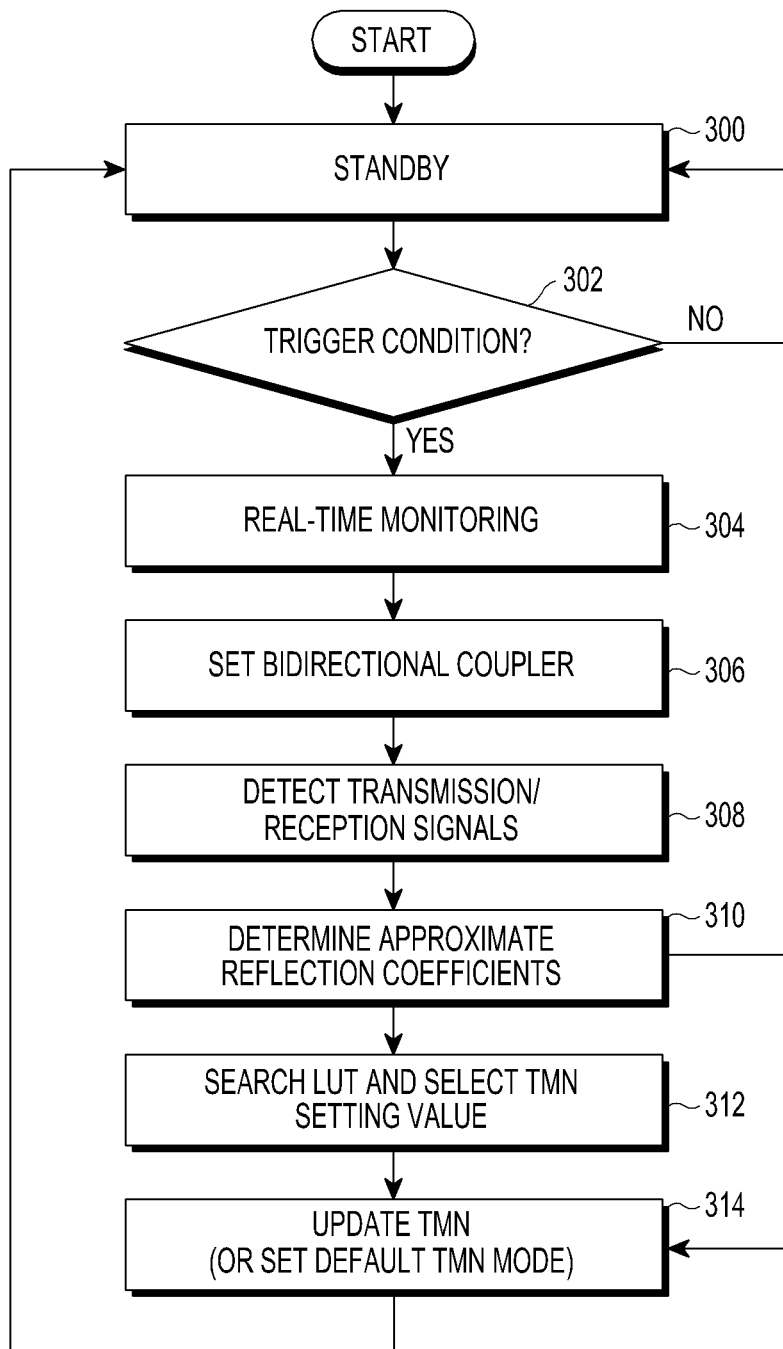
FIG. 3 is a flowchart illustrating a process of measuring an approximate reflection coefficient for lookup table (LUT)-based real-time antenna impedance matching according to an exemplary embodiment.

FIG. 3 is a flowchart illustrating a process of measuring an approximate reflection coefficient to perform LUT-based real-time antenna impedance matching according to an exemplary embodiment.

In operation 300, a terminal is in a standby state until its operation point is a CL-AIT operation point or more based on a trigger condition (e.g., the operation point of the terminal satisfies the trigger condition). The terminal may determine in operation 302 whether its operation point is the CL-AIT operation point or more based on the trigger condition. In other words, the CL-AIT operation point may be construed as a criterion (or condition) for determining whether to perform antenna impedance matching, by measuring the power of the signal transmitted through the antenna.

In response to its operation point being the CL-AIT operation point or more based on the trigger condition (e.g., determining whether to perform the impedance matching), the terminal may perform real-time monitoring on the bidirectional coupler in operation 304. In operation 306, the terminal may operate the above-described bidirectional coupler through the forward path or reverse path. In operation 308, the terminal may detect an input/output signal that is propagated in the forward path and/or reverse path of the bidirectional coupler. The terminal may store the detected input/output signal in a memory. In other words, the terminal may transfer input/output signals (e.g., signals $S_{fwd,tx}(t)$, $S_{fwd,rx}(t+\tau)$, $S_{rev,tx}(t)$, $S_{rev,rx}(t+\tau)$, as per the example specified in FIG. 2 and Equation (6)) as per the coupler mode to a dedicated hardware (H/W) block (e.g., a memory and the like) through the feedback loop by operating the bidirectional coupler, to store the input/output signals in the dedicated hardware block.

In operation 310, the terminal may time-align signals (e.g., signals $S_{fwd,tx}(t)$, $S_{fwd,rx}(t+\tau)$, $S_{rev,tx}(t)$, $S_{rev,rx}(t+\tau)$) as per the example specified in FIG. 2 and Equation (6), calculate b4/b3 using these signals, and set the calculated b4/b3 as an approximate reflection coefficient. In operation 312, the terminal may search the lookup table using the calculated approximate reflection coefficient and derive a TMN parameter mapped to the corresponding approximate reflection coefficient. In operation 314, the terminal may update the TMN parameter for setting the load impedance of the antenna end. By updating the TMN parameter, lookup table search may be precisely performed to provide high or maximum output power with respect to the updated position and thus a desired TMN parameter may be set.

In response to determining not to perform the precise lookup table search (e.g., the calculated approximate reflection coefficient does not satisfy the trigger condition), the terminal may optionally set to the default TMN mode.

Setting to the default TMN mode may refer to setting to provide high (or maximum) output power with respect to a predefined reference impedance position.

When the operation is completed up to operation 314, the terminal may proceed to operation 300, returning to the standby mode, and repeat subsequent operations.

Figure 4:
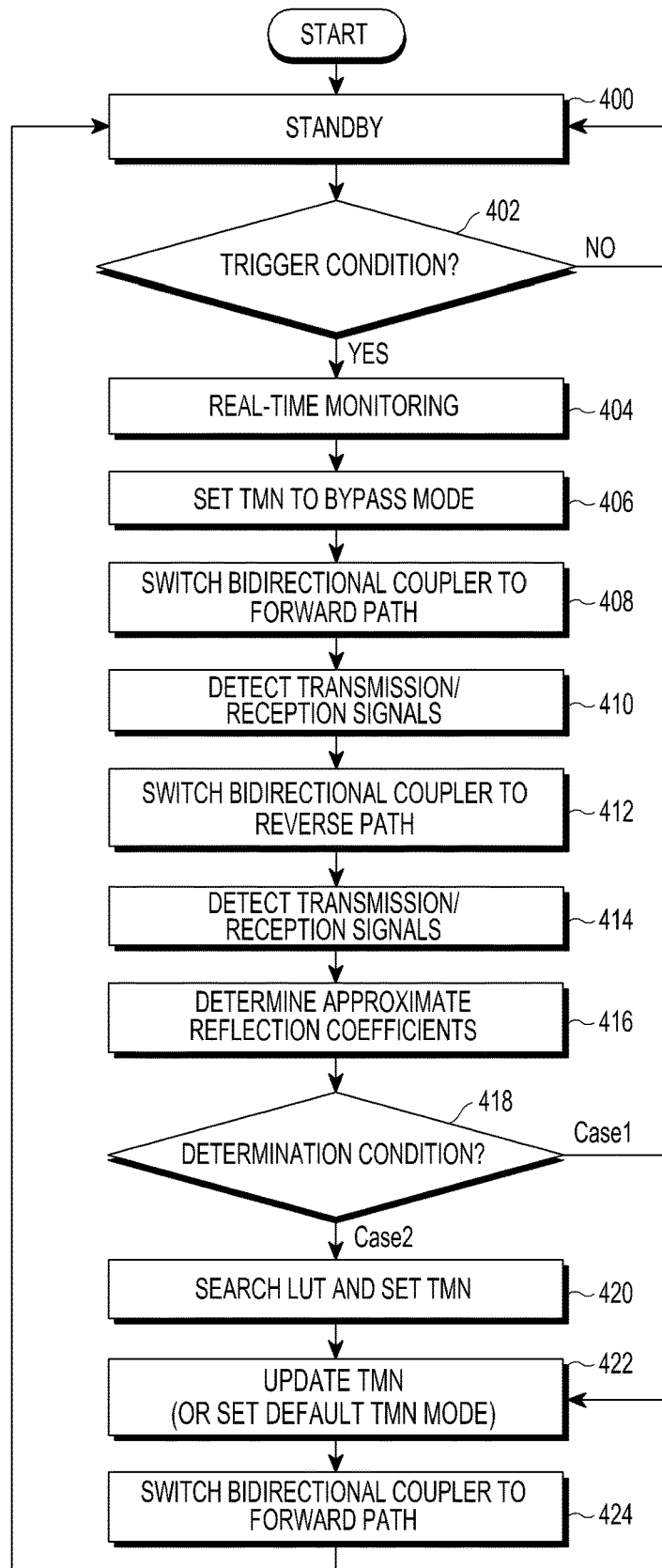
FIG. 4 is a detailed flowchart illustrating a process of measuring an approximate reflection coefficient for LUT-based real-time antenna impedance matching according to an exemplary embodiment.

FIG. 4 is a detailed flowchart illustrating a process of measuring an approximate reflection coefficient for LUT-based real-time antenna impedance matching according to an exemplary embodiment. FIG. 4 illustrates a detailed example of a process described with reference to of FIG. 3.

There may be various types of implementation scenarios according to exemplary embodiments. Herein, a case where the bidirectional coupler is used is considered.

In operation 400, a terminal is in a standby state until its operation point is a CL-AIT operation point or more based on a trigger condition. The terminal may determine in operation 402 whether its operation point is the CL-AIT operation point or more based on the trigger condition. In other words, the terminal may determine whether to perform antenna impedance matching, by determining whether it has measured the power of the signal transmitted through the antenna. When its operation point is the CL-AIT operation point or more based on the trigger condition, the terminal may perform real-time monitoring on the bidirectional coupler in operation 404.

In operation 406, the terminal may set a TMN to a bypass mode. Here, the bypass mode may refer to setting a TMN parameter having the least insertion loss without the impedance change for the TMN. In operation 408, the terminal may operate the bidirectional coupler through the forward path (or switch the bidirectional coupler to the forward path). In operation 410, the terminal may detect transmission and reception signals (e.g., a signal $S_{fwd,tx}(t)$ and a signal $S_{fwd,rx}(t+\tau)$), and store the detected signals in the memory through the feedback loop.

Next, in operation 412, the terminal may operate the bidirectional coupler through the reverse path (or switch the bidirectional coupler to the reverse path). In operation 414, the terminal may detect transmission and reception signals (e.g., a signal $S_{rev,tx}(t)$ and a signal $S_{rev,rx}(t+\tau)$), and store the detected signals in the memory through the feedback loop.

In operation 416, the terminal may time-align the transmission and reception signals (e.g., signals $S_{fwd,tx}(t)$, $S_{fwd,rx}(t+\tau)$, $S_{rev,tx}(t)$, $S_{rev,rx}(t+\tau)$), calculate b4/b3 using these signals, and set the calculated b4/b3 as an approximate reflection coefficient.

The terminal may determine in operation 418 whether a matrix determination condition for antenna impedance matching satisfies Case 1 or Case 2.

When the matrix satisfies Case 1 in operation 418 (e.g., the approximate reflection coefficient does not satisfy the trigger condition), the terminal does not perform a precise TMN search, and may set to a default TMN value (e.g., TMN setting that ensures high or maximum transmission power), and then return the bidirectional coupler and enter the standby mode. Setting to the default TMN mode may refer to setting to provide high or maximum output power with respect to a predefined reference impedance position.

On the other hand, when the matrix satisfies Case 2 in operation 418 (e.g., the approximate reflection coefficient satisfies the trigger condition), the terminal may precisely search the lookup table to perform more precise impedance matching and derive a desired TMN setting value from the lookup table searching, in operation 420. In operation 422, the terminal may update a TMN parameter. Updating the TMN parameter may refer to setting a TMN parameter to provide high or maximum output power with respect to the position updated from a predefined reference impedance position.

When operation 422 is completed, the terminal may return the bidirectional coupler in operation 424, and return to the standby mode.

Figure 5:
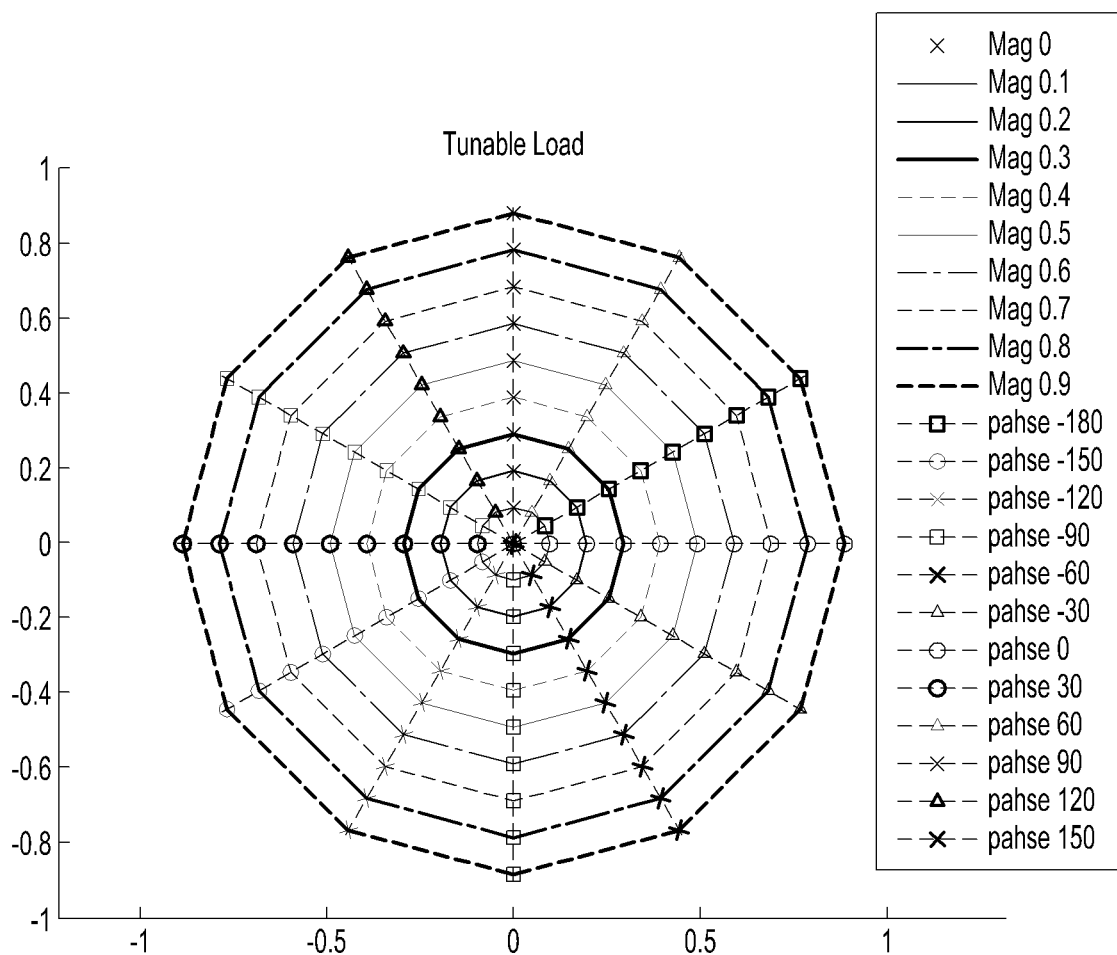
FIGS. 5 and 6 are graphs illustrating a relationship between actual load impedance and reflection coefficients measured according to an exemplary embodiment.
Figure 6:
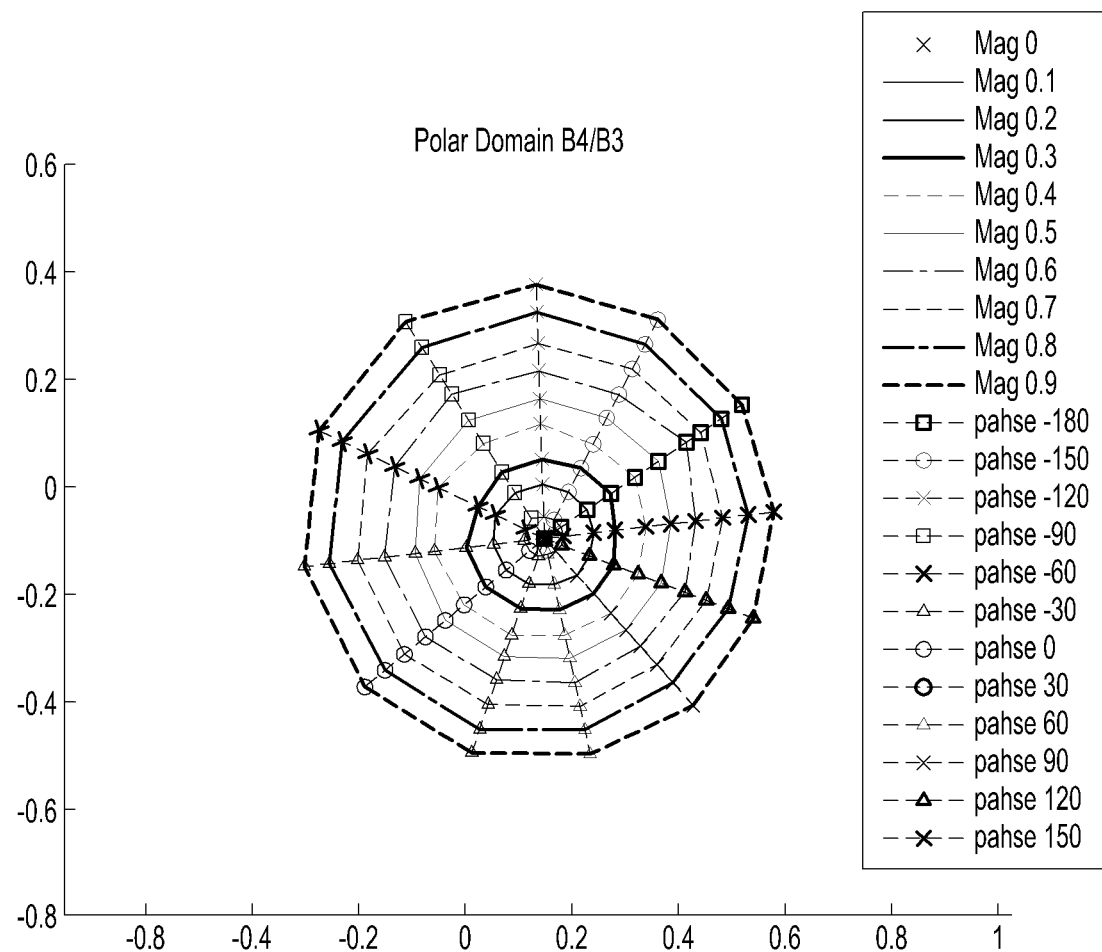

FIGS. 5 and 6 are graphs illustrating the relationship between the reflection coefficients measured according to an exemplary the actual load impedance.

Referring to FIGS. 5 and 6, the relationship between the approximate reflection coefficients measured according to an exemplary embodiment and the actual load impedance is shown. More specifically, FIG. 5 illustrates the actual load impedance, and FIG. 6 illustrates the approximate reflection coefficients according to an exemplary embodiment.

A reflection coefficient Γ, as shown in Equation (7) below, may be represented as a magnitude |Γ| and a phase $e^{j\theta_\Gamma}$ of the reflection coefficient Γ in the polar coordinate system, where the magnitude |Γ| has a range between 0 and 1, and the phase $e^{j\theta_\Gamma}$ has a range between −180° and +180°.

$$\Gamma = |\Gamma| \cdot e^{j\theta_\Gamma} = \Gamma_{Re} + \Gamma_{Im} = |\Gamma|\cos(\theta_\Gamma) + j \cdot |\Gamma|\sin(\theta_\Gamma) \quad (7)$$

FIG. 5 illustrates load impedance setting values transferred through the load pull tuner. The load impedance setting values in FIG. 5 are obtained by adjusting the magnitude of the reflection coefficient from 0 to 0.9 at intervals of 0.1, and the phase from −180° to 150° at intervals of 30°.

Generally, the magnitude of the reflection coefficient is a value obtained by dividing, by the total radius, the distance from the center point (e.g., the point indicating the characteristic impedance) to the load impedance point on the Smith chart, and the phase of the reflection coefficient refers to an angle up to the load impedance point.

FIG. 6 illustrates a b4/b3 matrix (e.g., approximate reflection coefficient) actually measured through the bidirectional coupler as described above in FIG. 2, for each load impedance to be transferred, according to an exemplary embodiment. In FIG. 6, the b4/b3 value is obtained by adjusting the magnitude of the reflection coefficient from 0 to 0.9 at intervals of 0.1, and the phase from −180° to 150° at intervals of 30°.

Although FIG. 6 shows magnitude scaling, phase rotation and center point shift due to the approximation, it can be seen that one-to-one mapping is accurately performed for each load point.

Accordingly, FIG. 6 shows that the b4/b3 matrix is an effective matrix expressing a reflection coefficient.

Figure 7:
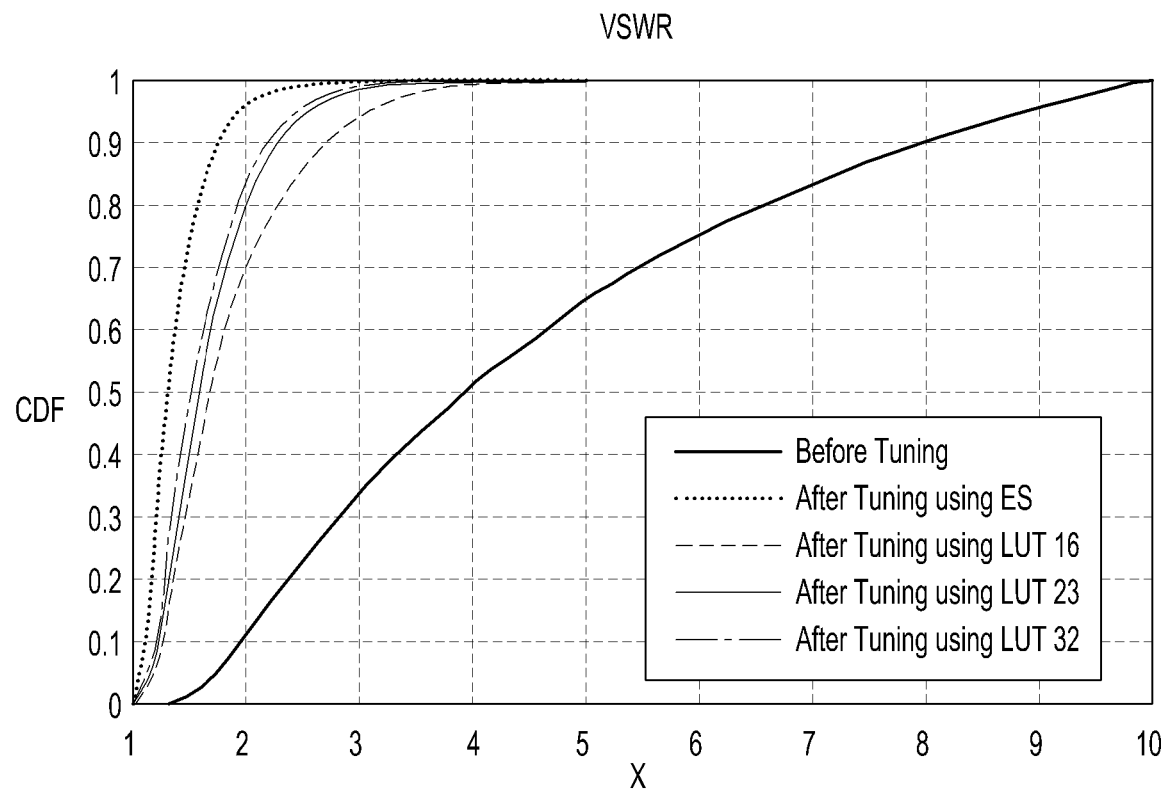
FIG. 7 is a graph illustrating impedance matching performance as per a number of reference impedance points to be included in an LUT for efficiency of an LUT size according to an exemplary embodiment.

FIG. 7 is a graph illustrating the impedance matching coverage (or performance) as per the number of reference impedance points to be included in the LUT for efficiency of the LUT size according to an exemplary embodiment.

Referring to FIG. 7, the x-axis represents VSWR of the load impedance, and the y-axis represents a cumulative distribution function (CDF) of the points satisfying the corresponding VSWR after undergoing impedance matching using the lookup table.

In an exemplary embodiment, to perform antenna impedance matching, the load impedance may be measured through measurement of the approximate reflection coefficient that is one-to-one mapped to the actual reflection coefficient without the measurement of the S-parameter for real-time CL-AIT implementation, and a predefined lookup table may be provided based thereon.

To reduce the additional complexity, the effective and smallest lookup table size may be calculated in advance through the precise lookup table search. The precise lookup table search represents a scheme for searching the settable TMN values to select the best matching value. Assuming that a VSWR of 10:1 is defined as the upper limit, and the impedance matching result as to the lookup table size is obtained by setting a load impedance of random 10,000 points on the Smith chart, it is noted that in the case of long term evolution (LTE) low band, as shown in FIG. 7, the VSWR that is reduced more than 10:1 may be determined through a cumulative distribution function (CDF).

A method for determining the points to be used in generation of the lookup table may include a method for calculating a CDF satisfying the corresponding VSWR for the entire impedance region and selecting the number of lookup table points that represent the desired CDF value. In an exemplary embodiment, it is possible to generate the desired antenna impedance using the load pull tuner during generation of the lookup table, and estimate the approximate reflection coefficient therefor and the TMN value transmitting high or maximum power, to thereby generate the lookup table.

Figure 8:
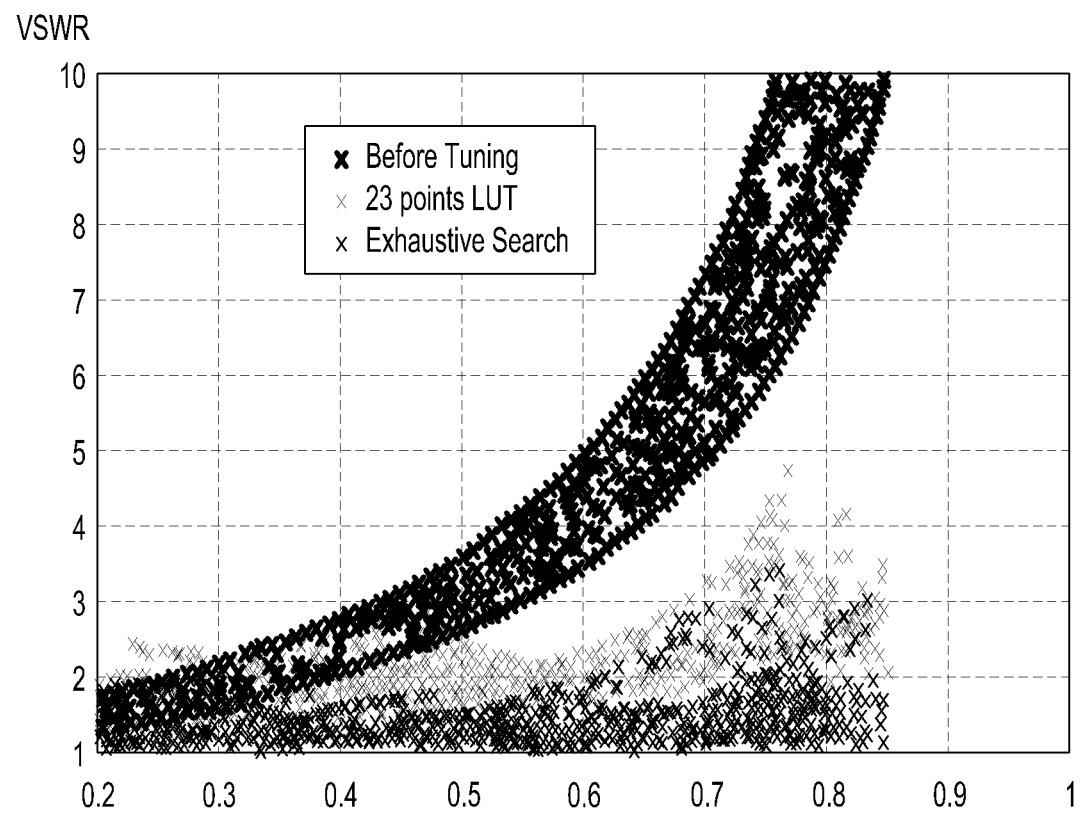
FIG. 8 is a graph illustrating a matching result before impedance matching is performed, a matching result obtained by using a 23-point LUT, and a matching result obtained through exhaustive search according to an exemplary embodiment.

FIG. 8 is a graph illustrating a matching result before impedance matching is performed, a matching result obtained by using a 23-point LUT, and a matching result obtained by calculating the accurate $\Gamma_L$ through the precise lookup table search according to an exemplary embodiment.

The x-axis represents a magnitude $|\Gamma_L|$ of the load impedance and the y-axis represents a VSWR of $\Gamma_{in}$ after undergoing impedance matching. In a case where there is no matching impedance, as a magnitude of the reflection coefficient is greater, the VSWR increases more rapidly. On the other hand, when the impedance matching has been conducted, the constant VSWR is maintained regardless of the magnitude of the reflection coefficient. Further, it can be seen in FIG. 8 that the matching result obtained by calculating the accurate $\Gamma_L$ through the precise lookup table search and the matching result obtained by using only the 23-point lookup table are similarly distributed within the error range without a substantial difference, when viewed on the basis of a VSWR of 3:1. In other words, although the impedance matching is performed using only the 23-point lookup table, the sufficient correction effect may be obtained.

Any constellation point may be used in the lookup table according to an exemplary embodiment. As an example, it is possible to use an effective coverage-increased lookup table by adjusting the 23-point lattice-like load impedance structure in the form of 24-point radiation or polar to increase or maximize the efficiency with the minimum lookup table. The reference impedance of the lookup table may be continuously changed to increase the efficiency.

Figure 9:
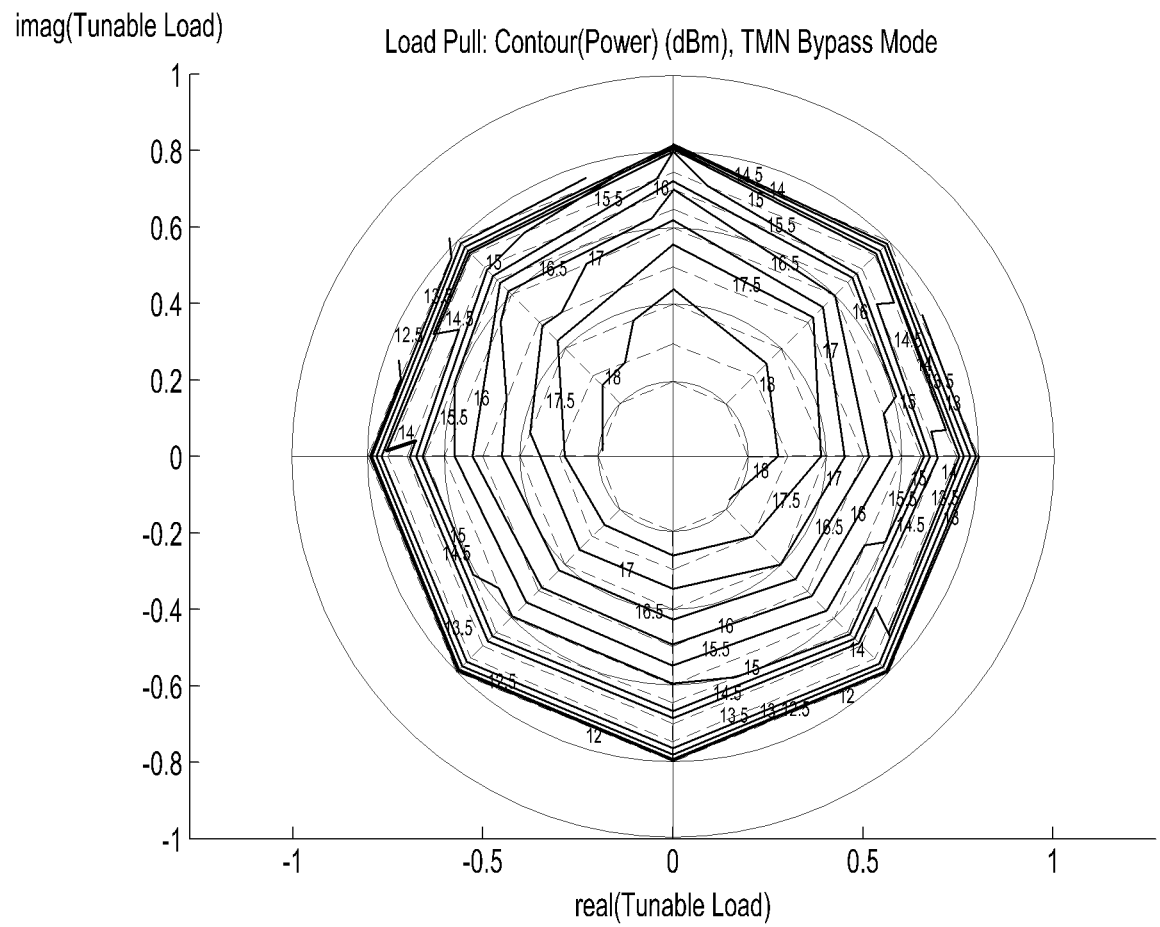
FIGS. 9 and 10 are graphs illustrating transmission power as per load impedance before and after application of closed loop-antenna impedance tuning (CL-AIT) according to an exemplary embodiment.
Figure 10:
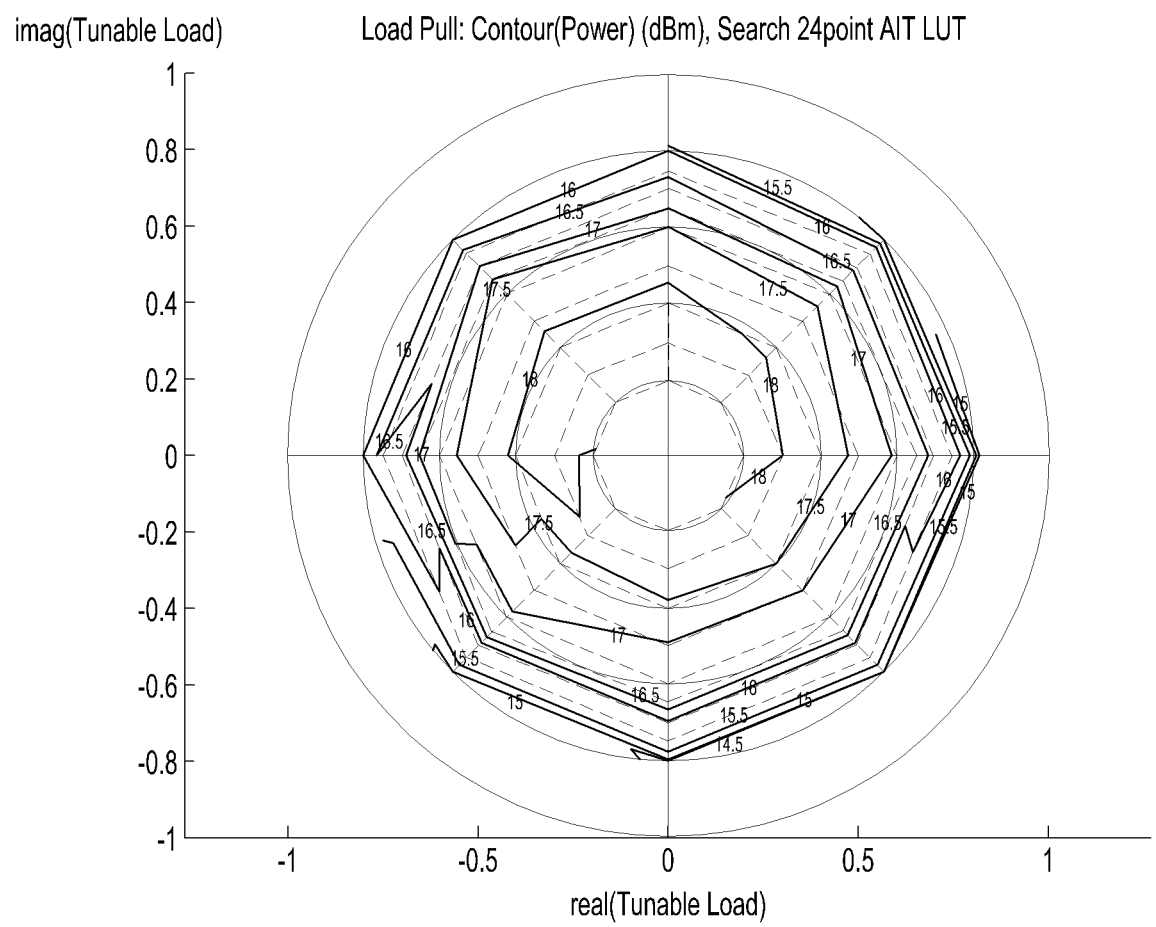

FIGS. 9 and 10 are graphs illustrating distribution of the transmission power as per the load impedance before and after application of CL-AIT (the TMN bypass mode) according to an exemplary embodiment.

FIG. 9 illustrates the output power as per the load impedance in the TMN bypass mode (or TMN setting having the least TMN insertion loss).

FIG. 10 illustrates the load-specific output power after antenna impedance matching by the AIT lookup table solution based on the same load impedance according to an exemplary embodiment.

Figure 11:
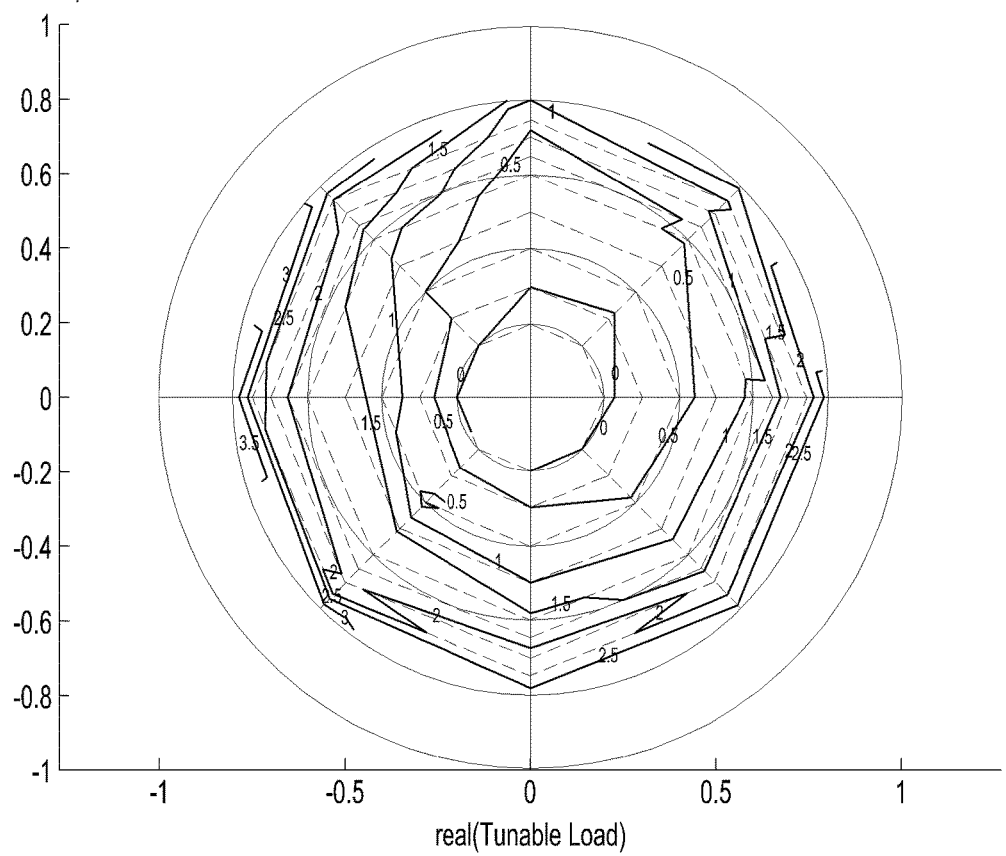
FIG. 11 is a graph illustrating power gain between FIG. 9 (before application of an AIT LUT solution) and FIG. 10 (after application of the AIT LUT solution)

For comparison, FIG. 11 illustrates the power gain between FIG. 9 (before application of the AIT lookup table solution) and FIG. 10 (after application of the AIT lookup table solution).

In an area around the center having the low VSWR of the load impedance, the transmission power degradation by the reflected wave is low, and thus, the performance improvement may not be great. On the other hand, with respect to the load impedance point having the high VSWR, the performance improvement may increase up to 3.5 dB~4 dB. In other words, as the VSWR is higher, the performance improvement may be greater. For example, a VSWR of 10:1 represents the point where a reflection coefficient's magnitude $|\Gamma_L|$ is 0.818.

The real-time CL-AIT scheme according to an exemplary embodiment may perform real-time antenna impedance matching by estimating the actual load impedance through the measurement of the low-complexity approximate reflection coefficient. Further, the real-time CL-AIT scheme according to an exemplary embodiment may reduce or minimize the output power loss of the transmitter by estimating substantially all of the load impedance variation through one-to-one mapping between the approximate reflection coefficient and the actual reflection coefficient.

In particular, in an exemplary embodiment, the reflection coefficient may be measured based on the ratio of the signal reflected through the reverse path to the signal transmitted through the forward path of the bidirectional coupler, instead of measuring the reflection coefficient only by using the signal reflected through the reverse path. Therefore, although the phases of elements (particularly, the elements of the RF unit, including the local oscillator) are initialized every time as the on/off or sleep mode operation is performed to reduce the power consumption, it is possible to calculate the accurate phase of the reflection coefficient at all times.

According to an exemplary embodiment, the call quality degradation by the death grip phenomenon, in which the antenna sensitivity is lowered by, for example, a user's contact with the mobile device (e.g., holding the mobile device by a user's hand to make a call), occurring in the metallic designed mobile device may be avoided, and the proper transmission power may be maintained in real time despite the various changes to the load, thereby making it possible to increase the battery life.

Figure 12:
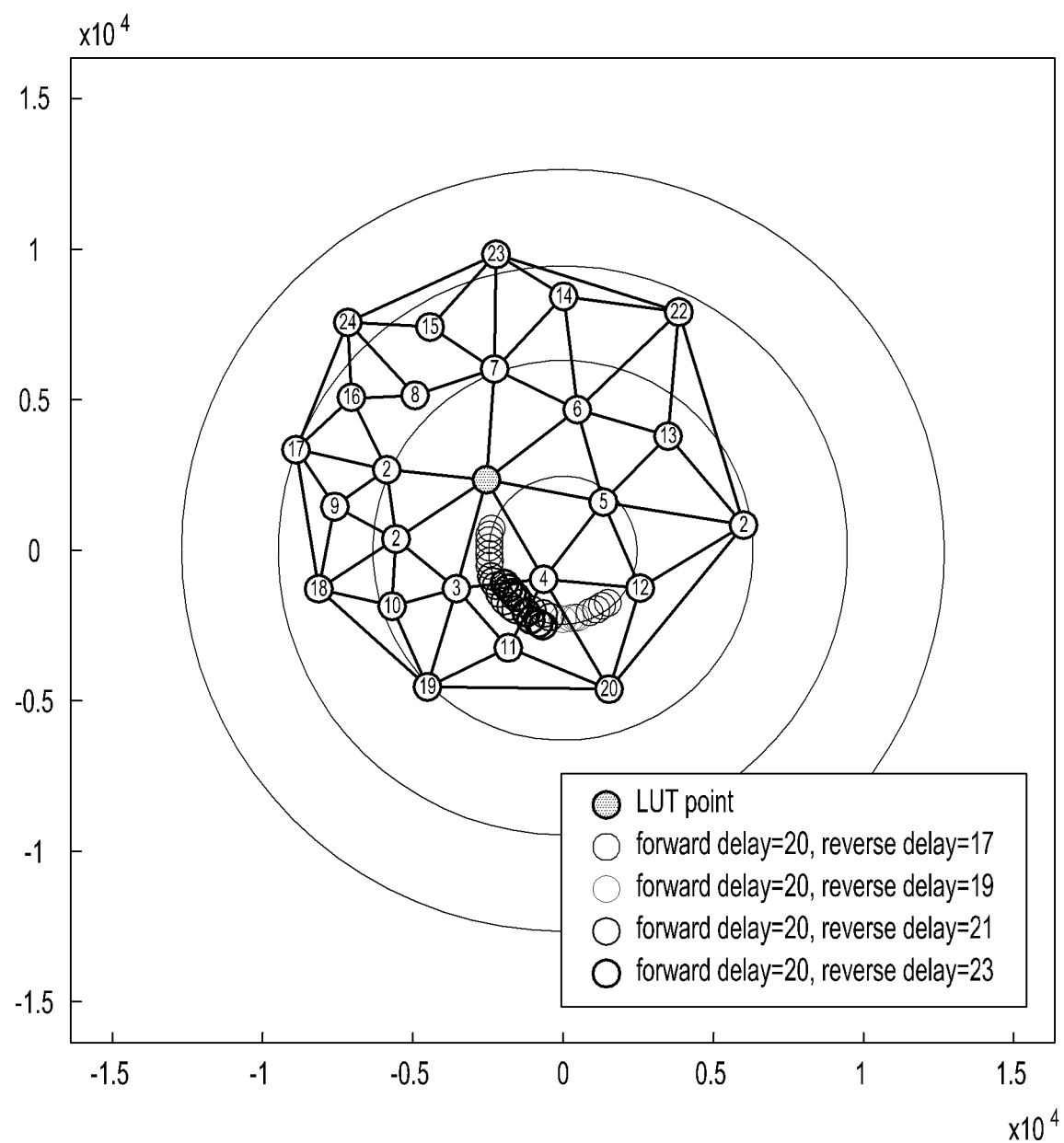
FIG. 12 is a graph illustrating an example of applying an antenna impedance matching method according to another exemplary embodiment.

FIG. 12 is a graph illustrating an example of applying an antenna impedance matching method according to another exemplary embodiment.

More specifically, FIG. 12 illustrates a phenomenon in which the measured b4/b3 values are spread when there is a delay difference between the forward path and the reverse path.

Referring to FIG. 12, the phase change of b4/b3 is shown when a delay value is maintained at, for example, 20 in the forward path of the bidirectional coupler and a delay value is set to, for example, 17, 19, 21 and 23 in the reverse path.

Assuming that the bidirectional coupler has four ports as shown in FIG. 2, the impedance may be approximated as a ratio of a reflected transmission signal b4 incoming to the bidirectional coupler through the reverse path to a transmission output signal b3 incoming to the bidirectional coupler through the forward path.

A method of estimating the reflection coefficient through b4/b3 has been described using Equations (1) to (5).

In reality, b4/b3 may be determined as a digital signal in the modem, and may be determined as a ratio of the maximum value of a correlation between a transmission signal s in the modem and a received signal r incoming through the bidirectional coupler, as shown in Equation (8) below.

$$\frac{b_4}{b_3} = \frac{|s_1(t)|^2}{|s_2(t)|^2} \frac{\max_{\tau_1 \in D} (s_2(t) \otimes r_2(t+\tau_2))}{\max_{\tau_1 \in D} (s_1(t) \otimes r_1(t+\tau_1))} \quad (8)$$

In Equation (8), since delays $\tau_1$, $\tau_2$ include a delay on an analog front path of an antenna, every terminal has an error, and when the delays are set as a representative value, an error of b4/b3 may occur by the error.

Further, more errors may occur due to the delay variation as per the real-time temperature change, and to solve this problem, there is a need for a scheme capable of real-time delay estimation without an additional delay estimation device. In an exemplary embodiment, it is possible to estimate the delay in real time without the additional device, by estimating the analog front delay using the delay difference value generated in the process of finding the maximum correlation value as in Equation (8).

Estimation for the actual delay may be represented as shown in Equation (9) below, and the delay may be measured for each of the forward path and the reverse path.

$$D = \{-\Delta, -\Delta+1, \ldots, 0, \ldots, +\Delta-1, +\Delta\} \quad (9)$$

$$\Delta_{forward} = \underset{\tau_1 \in D}{\arg\max}\{s_1[n] \otimes r_1[n+\tau_1]\}$$

$$\Delta_{reverse} = \underset{\tau_2 \in D}{\arg\max}\{s_2[n] \otimes r_2[n+\tau_2]\}$$

$$s[n] \otimes r[n+\tau] \equiv \sum_{n=0}^{N-1} s[n]r[n+\tau]$$

where $\Delta$ represents a delay value. In a case where the $\Delta$ value is large, when the convergence rate is high, the delay estimation may be quick, but the computation is large. On the other hand, in a case where the $\Delta$ value is small, when the convergence rate is low, the delay estimation may be slow, but the computation is small. To reduce the computation, it is set as D={-1, 0, +1}, and instead, the representative value measured through calibration is entered as an initial delay value to reduce the convergence time.

Figure 13:
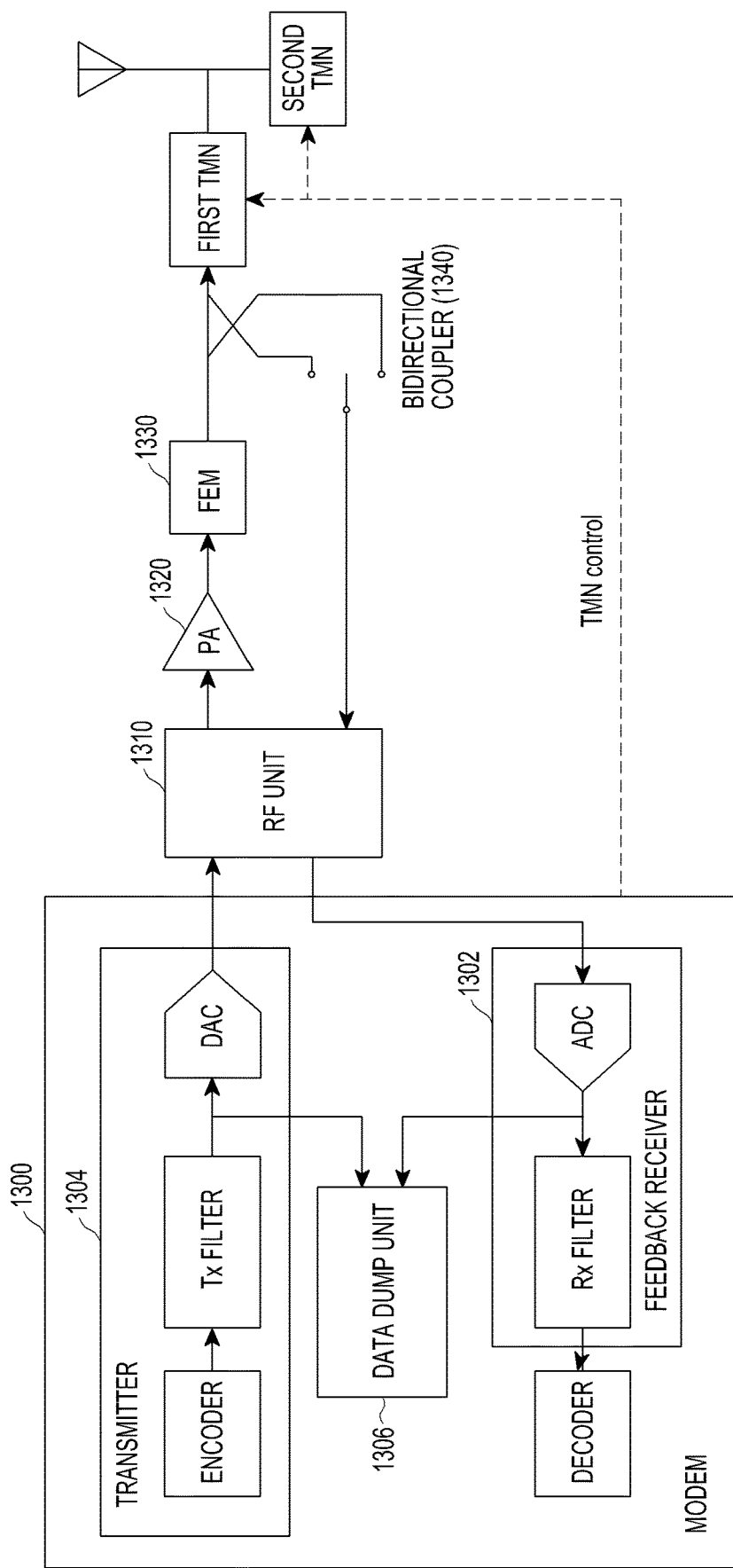
FIG. 13 is a block diagram of an antenna impedance matching device according to another exemplary embodiment.

FIG. 13 is a block diagram of an antenna impedance matching apparatus according to another exemplary embodiment.

The antenna impedance matching apparatus in FIG. 13 may include a modem 1300, and the modem 1300 may include a transmitter 1304, a data dump unit 1306, a decoder, and a feedback receiver 1302.

A power amplifier 1320, a front-end module (FEM) 1330, a bidirectional coupler 1340, and a feedback receiver 1302 in FIG. 13 are similar to the power amplifier PA, the duplexer 100, the bidirectional coupler 101 and the feedback controller 102 in FIG. 1A, respectively, and detailed descriptions thereof will be omitted.

The modem 1300 in FIG. 13 may include a data dump for correlation calculation and the data dump unit 1306 that compensates for the measured delay. As for the delay, the data dump unit 1306 in the modem may compensate for the delay by adjusting the dump timing between the transmitter 1304 and the feedback receiver 1302. Although not shown in the drawing, the dump timing may be simply adjusted in the modem 1300 by register setting.

By performing infinite impulse response (IIR) filtering on the delay of the maximum correlation value generated in the CL-AIT scheme and applying the delay value calculated thereby back to the register, the initial delay setting value may increase the convergence rate by applying the representative value measured through calibration.

Figure 14:
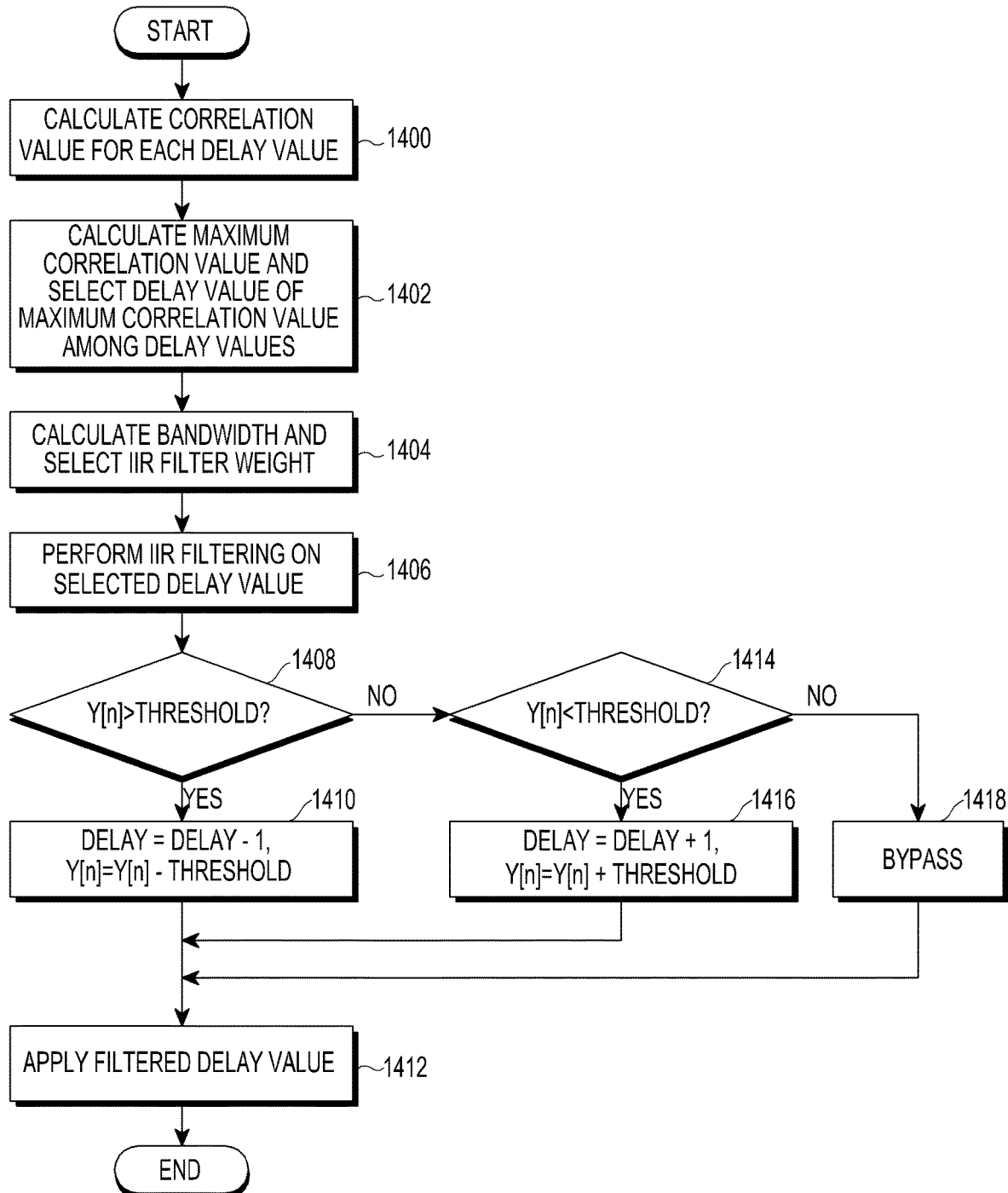
FIG. 14 is a flowchart illustrating an antenna impedance matching method according to another exemplary embodiment.

FIG. 14 is a flowchart illustrating an antenna impedance matching method according to another exemplary embodiment. Specifically, FIG. 14 illustrates a flowchart illustrating a process of estimating delay.

First, in operation 1400, the terminal may calculate a correlation value for each delay value, and select the maximum correlation value from among the calculated correlation values. Thereafter, in operation 1402, the terminal may select a delay value for the selected maximum correlation value.

In operation 1404, the terminal may calculate a bandwidth for the selected delay value, and select an IIR filter weight. This is to apply a weight to an IIR filter input depending on the signal bandwidth. It is possible to reduce the delay error in a narrow signal bandwidth by applying a weight to an IIR filter input depending on the signal bandwidth during the real-time delay estimation. The signal bandwidth may include a change to the bandwidth as per the communication system scheme and/or the bandwidth as per the signal assignment.

In operation 1406, the terminal may perform IIR filtering on the delay measured in real time. During the next correlation measurement for the calculated delay value, by using the calculated delay value as a delay value, it is possible to adaptively perform delay tracking.

A detailed operation of the IIR filtering is as follows.

In operation 1408, the terminal may determine whether an IIR filtering output value y[n] is greater than a threshold.

When the IIR filtering output value y[n] is greater than the threshold, the terminal may subtract 1 from the delay value, and subtract a threshold from the IIR filter buffer, in operation 1410.

On the contrary, when the IIR filtering output value y[n] is less than a threshold in operation 1414, the terminal may add 1 to the delay value and add the threshold to the IIR filter buffer, in operation 1416.

When the IIR filtering output value y[n] is greater than the threshold in operation 1414, the terminal may enter the bypass mode in operation 1418.

Finally, after operation 1410, operation 1416 or operation 1418, the terminal may apply the delay value calculated through the IIR filtering as a delay setting value during the actual correlation measurement in operation 1412. In other words, the terminal may use the calculated delay value as a delay value during the next correlation measurement.

The terminal may compensate for the delay while the terminal maintains to use the delay parameter value estimated through the IIR filtering process, for the register.

Figure 15:
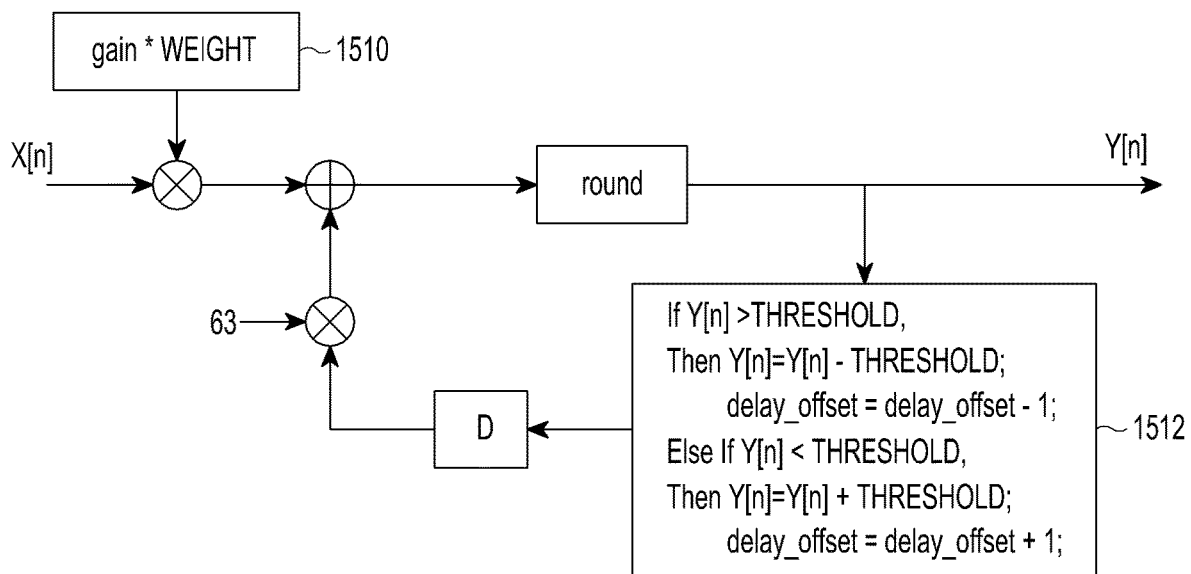
FIG. 15 is a diagram illustrating a fixed-point structure of an infinite impulse response (IIR) filter according to another exemplary embodiment.
Figure 16A:
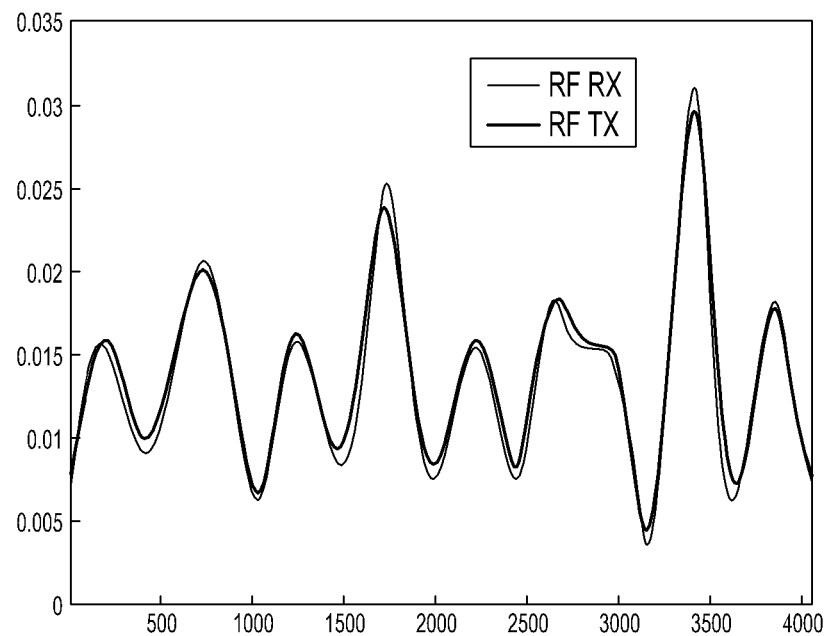
FIGS. 16A and 16B and FIGS. 17A and 17B are graphs illustrating a correlation result with a time-domain signal when a resource block (RB) size is 1 and 50 respectively, in long term evolution (LTE)
Figure 16B:
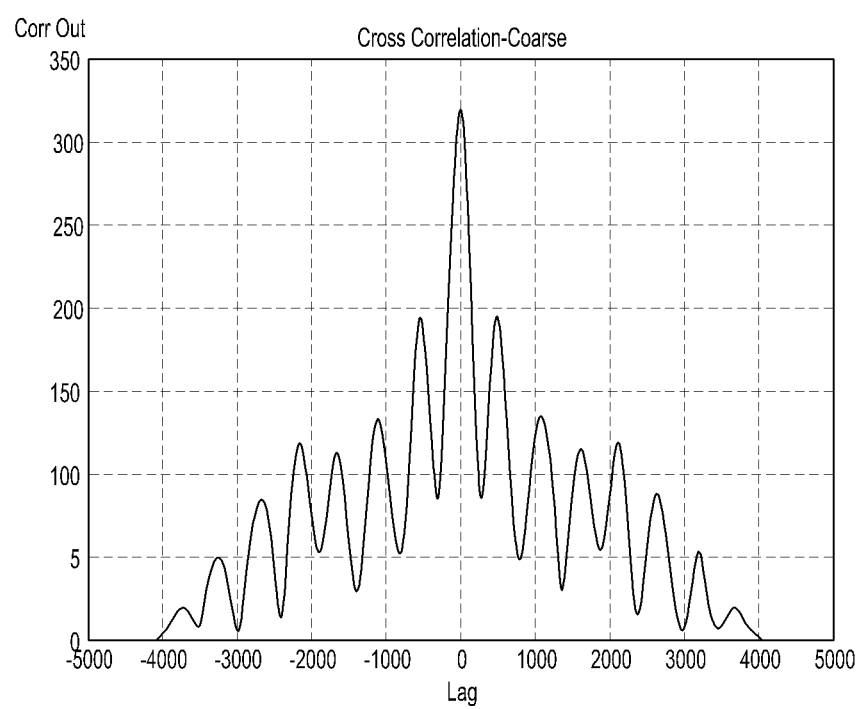
Figure 17A:
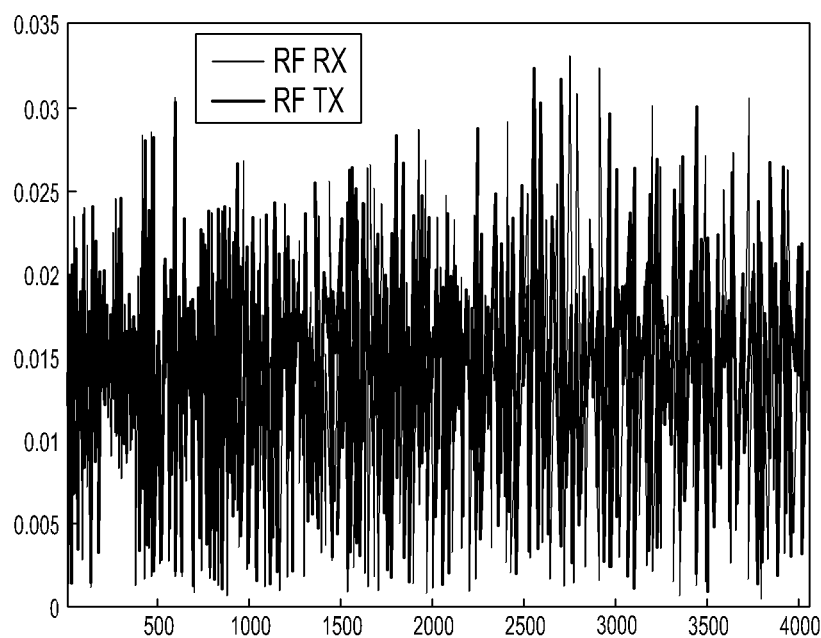
Figure 17B:
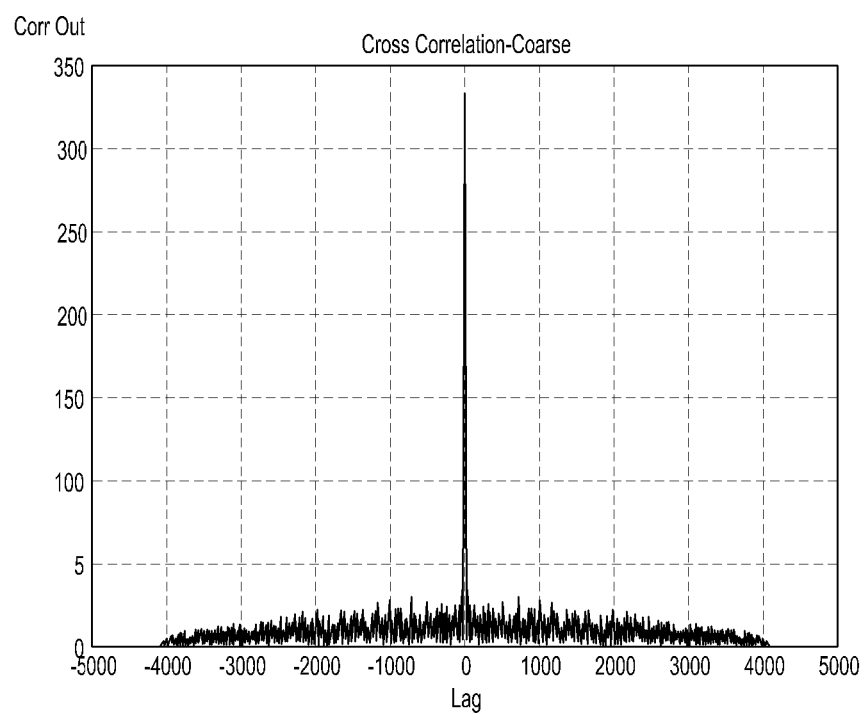

FIG. 15 is a diagram illustrating a fixed-point structure of an IIR filter according to another exemplary embodiment.

FIG. 15 illustrates an example of applying a weight to an IIR filter input. When a weight 1510 is applied to an IIR filter input based on the signal bandwidth, a narrow-bandwidth signal may be introduced during the real-time estimation. In this case, a delay error may occur due to the inaccurate correlation. To avoid the delay error, for example, a weight 1510 of the IIR filter input may be set as 1 when it is greater than or equal to 12 resource blocks (RBs), and set as 0 when it is less than 12 RBs. This is only an example and the exemplary embodiments are not limited thereto.

The reason is as follows. As shown by reference numeral 1510, in a scenario of applying a weight to an IIR filter input depending on the signal bandwidth, a narrow-bandwidth signal may come in during the real-time estimation. In this case, a delay error may occur due to the inaccurate correlation.

In determining whether an IIR filtering output value y[n] is greater than a threshold (operation 1512), when the IIR filtering output value y[n] is greater than the threshold, the terminal may subtract 1 from a delay offset, and subtract the threshold from an IIR filter buffer. On the contrary, when the IIR filtering output value y[n] is less than a threshold, the terminal may add 1 to a delay offset, and add the threshold to the IIR filter buffer.

FIGS. 16A and 16B and FIGS. 17A and 17B are graphs illustrating the correlation result with the time-domain signal when the RB size is 1 and 50 respectively, in LTE.

In the case of a 1-RB signal, the time-domain signal varies slowly and the correlation also varies smoothly, and thus a delay variation (e.g., dispersion) is large compared with a 50-RB signal. As a result, there may occur a phenomenon in which the b4/b3 value fluctuates. Therefore, IIR filtering may be optionally performed when the signal bandwidth is wide, and a high weight may be applied to a wide-bandwidth signal compared with a narrow-bandwidth signal, enabling robust impedance matching regardless of the signal bandwidth.

Figure 18A:
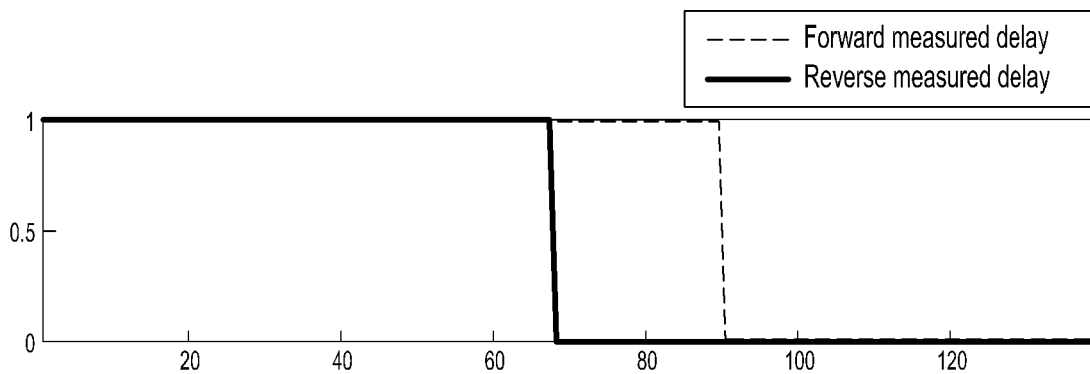
FIG. 18A is a graph illustrating forward and reverse real-time measured delay values according to another exemplary embodiment.

FIG. 18A is a graph illustrating forward and reverse real-time measured delay values according to another exemplary embodiment.

FIG. 18A shows the delay estimation results when a terminal with the actual delay value=19 gives an error by applying 23 as an initial delay register setting value for the forward path, and applying 22 for the reverse path. For example, for LTE Band 5 (the frequency bandwidth of which is 844 Mhz for uplink (UL)) and 50 RB assignment, a delay 1 sample corresponds to about 8 ns (or 61.44 Mhz sample rate).

Figure 18B:
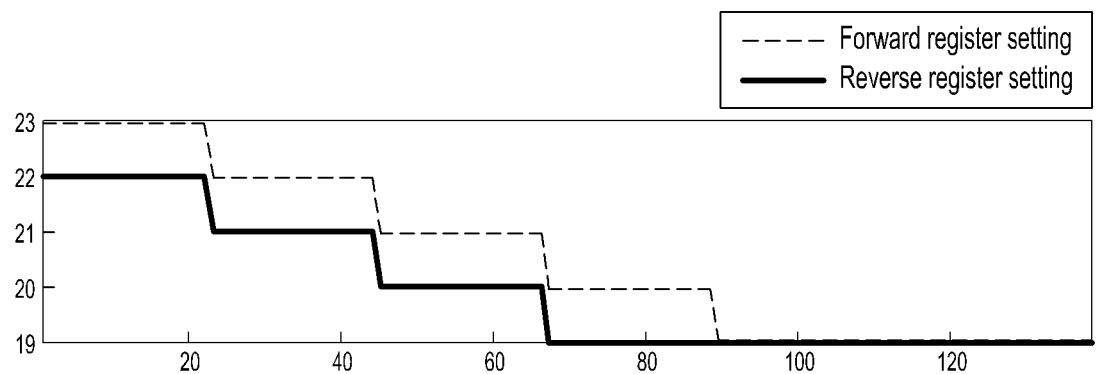
FIG. 18B is a graph illustrating convergence of delay register settings in a case where forward and reverse IIR filter outputs are greater than or equal to a threshold, according to another exemplary embodiment.

FIG. 18B is a graph illustrating that delay register setting values converge on 19, in a case where an IIR filter output value is greater than or equal to a threshold.

Figure 18C:
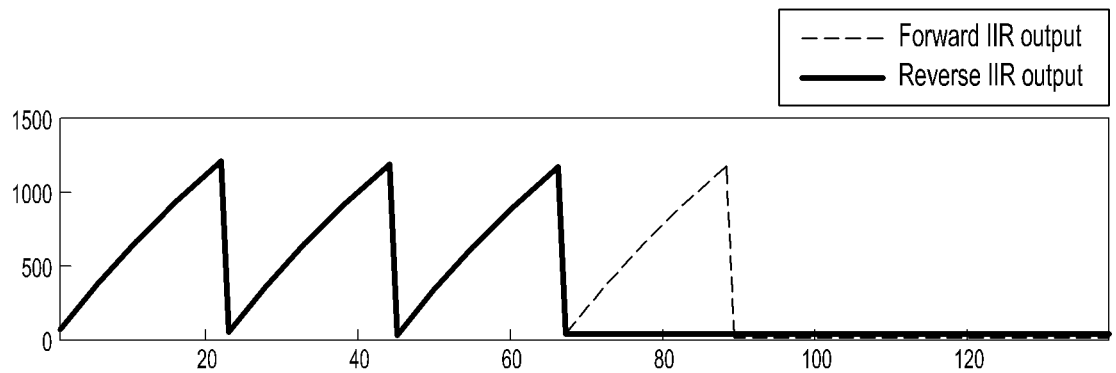
FIG. 18C is a graph illustrating a change in forward and reverse IIR filter outputs according to another exemplary embodiment.

FIG. 18C is a graph illustrating the change in IIR filter outputs, and it can be seen that when the accumulated value exceeds a threshold, the threshold is subtracted and the delay register setting value is reduced by 1.

Figure 19:
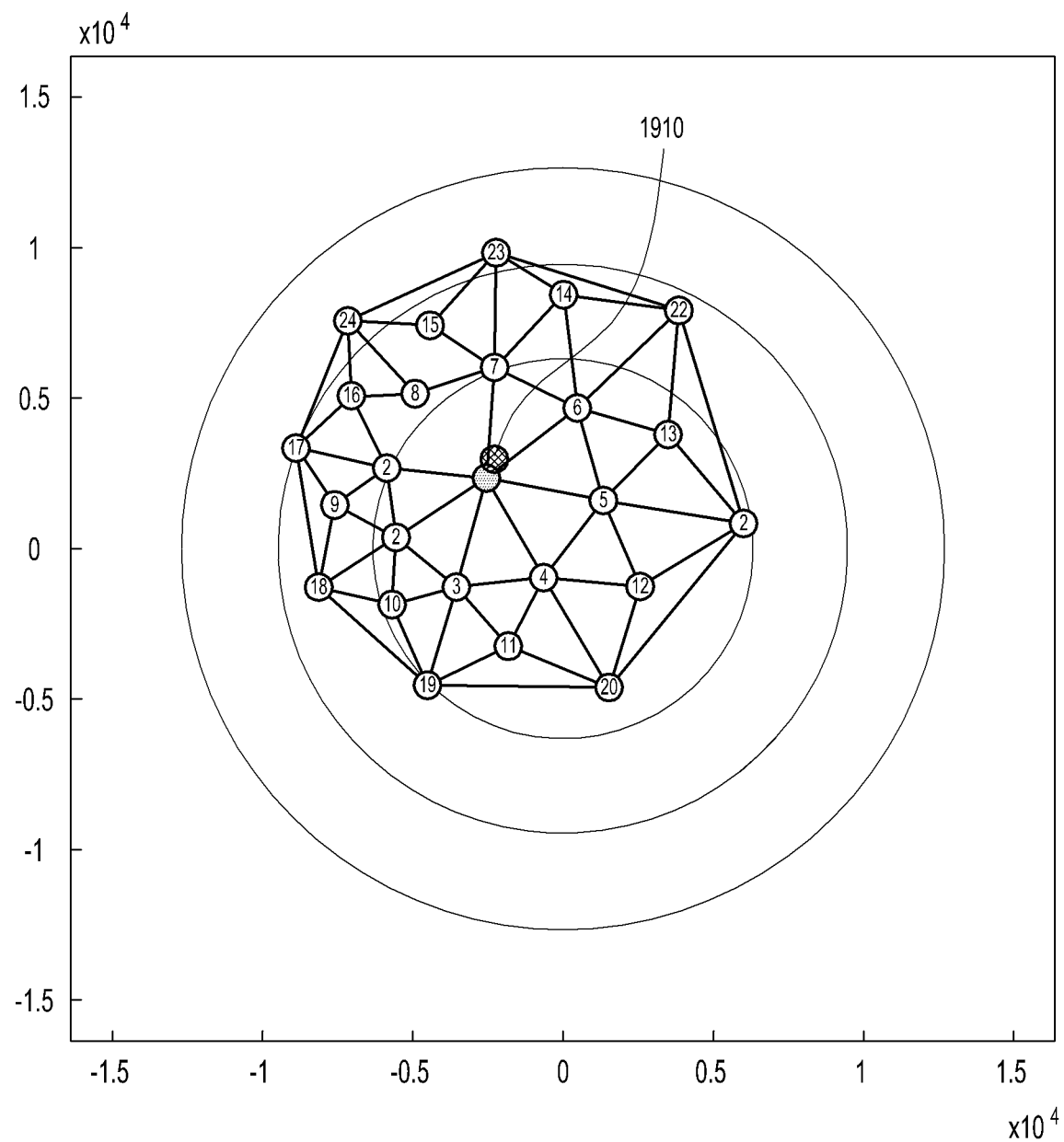
FIG. 19 is a graph illustrating a result obtained by measuring b4/b3 according to another exemplary embodiment.

When the delay is corrected and b4/b3 is measured in this way, it is shown that a constant value is represented as in FIG. 19. In FIG. 19, reference numeral 1910 represents the measured b4/b3, and the remaining points represent an LUT index of each load point, which is used for closed-loop antenna impedance matching. When an IIR filter output is in a steady state by converging, it is possible to estimate a fractional delay with a ratio of the IIR filter output to the threshold by using this value. For example, when the threshold is 1200 and the IIR filter output value in the steady state is 23, the fractional delay is 1 sample×23/1200 (or 8 ns×23/1200=0.15 ns). The fractional delay may be compensated in the dump delay control block 1306 in FIG. 13, and the possible compensation resolution may vary depending on the hardware resolution of the corresponding block. A phase offset of b4/b3, which occurs by the fractional delay, may be as shown in Equation (10) below.

$$\frac{b_4}{b_3} = \frac{|s_1(t)|^2}{|s_2(t)|^2} \cdot \frac{(s_2(t) \otimes r_2(t+\tau_2))}{(s_1(t) \otimes r_1(t+\tau_1))} e^{j2\pi(f_2\tau_2 - f_1\tau_1)} \qquad (10)$$

Herein, when $\tau_1, \tau_2$ is a fractional delay of the forward and reverse paths, a phase offset of $e^{j2\pi(f_2\tau_2 - f_1\tau_1)}$ may occur.

Therefore, it is possible to directly compensate a phase offset value of b4/b3 even for a phase offset below the hardware resolution.

The exemplary embodiments may increase the convergence rate by applying a representative value measured through calibration as an initial delay setting value by way of performing IIR filtering on a delay of the maximum correlation value occurring in the real-time closed-loop antenna impedance matching method and applying the filtered delay value back to the delay register.

The exemplary embodiments may reduce the delay error due to a narrow signal bandwidth by applying a weight to an IIR filter input depending on the signal bandwidth during the real-time delay estimation. Here, the signal bandwidth may include a change to the bandwidth as per the communication system scheme and/or the bandwidth as per the signal assignment.

The exemplary embodiments may apply an IIR filter to each of a bidirectional coupler for the forward path and a bidirectional coupler for the reverse path during the real-time closed-loop antenna impedance matching, and apply the delay during the next correlation measurement, so the active real-time delay estimation may be possible, thereby making it possible to reduce the delay measurement time occurring in the manufacturing process.

It should be noted that the drawings, flowcharts and block diagrams illustrated in FIGS. 1 to 19 are not intended to limit the scope. In other words, not all of the information, fields, components or operations disclosed in FIGS. 1 to 19 should be construed as the prerequisites for implementation, and only some of the components may be included to implement the disclosure without departing from the spirit and scope of the disclosure.

The above-described operations may be implemented by mounting a memory device storing the corresponding program code in the entity, the function, the base station and/or the terminal of the communication system, and/or in any component of the vehicle device. In other words, a controller of the entity, the function, the base station, the terminal or the vehicle device may run the above-described operations by reading the program code stored in the memory device by means of a processor or a central processing unit (CPU).

Various components and modules of the entity, the function, the base station, the terminal and/or the vehicle device described herein may be operated using a hardware circuit (e.g., a complementary metal oxide semiconductor (CMOS)-based logical circuit), or a hardware circuit such as a combination of firmware, software and/or software inserted into hardware, firmware and/or a machine-readable medium. For example, various electrical structures and methods may be implemented using electrical circuits such as transistors, logic gates and application-specific integrated circuits (ASICs).

As is apparent from the foregoing description, according to the exemplary embodiments, it is possible to increase or maximize the efficiency of the transmission power of the antenna in the wireless communication system.

Further, according to the exemplary embodiments, it is possible to increase or maximize the transmission power of the antenna without the complex operation in the wireless communication system.

Moreover, according to the exemplary embodiments, it is possible to substantially prevent the death grip phenomenon in which the transmission and/or reception sensitivity of the radio waves is abruptly lowered in the situation where the load impedance of the terminal varies, in the wireless communication system.

While the disclosure has been shown and described with reference to certain exemplary embodiments thereof, it will be understood by those skilled in the art that various changes in form and details may be made therein without departing from the spirit and scope of the disclosure as defined by the appended claims and their equivalents.

What is claimed is:

1. A method for matching antenna impedance in a wireless communication system, the method comprising:
   obtaining a forward path signal (b3), which is a signal that passes through a bidirectional coupler and transmitted to an antenna, and a reverse path signal (b4), which is a signal that is reflected from the antenna and transmitted to the bidirectional coupler;
   identifying a value of a ratio (b4/b3) of the reverse path signal to the forward path signal as an approximate reflection coefficient;
   identifying an antenna impedance matching parameter that is mapped to the value of the ratio (b4/b3) of the approximate reflection coefficient in a lookup table obtained by estimating approximate reflection coefficients corresponding to variation of a load impedance that is generated by using a load pull tuner; and
   performing antenna impedance matching based on the antenna impedance matching parameter.

2. The method of claim 1, further comprising identifying whether to perform the antenna impedance matching based on measured power of a signal transmitted through the antenna.

3. The method of claim 1, further comprising:
   identifying whether the approximate reflection coefficient satisfies a certain condition;
   in response to identifying that the approximate reflection coefficient does not satisfy the certain condition, setting a default antenna impedance matching parameter corresponding to maximum transmission power; and
   in response to identifying that the approximate reflection coefficient satisfies the certain condition, searching for an additional antenna impedance matching parameter.

4. The method of claim 1, further comprising obtaining an error of the approximate reflection coefficient due to a delay on an analog front path.

5. The method of claim 4, wherein the obtaining comprises:
   obtaining a correlation value of a received signal with respect to a transmission signal;
   selecting a maximum correlation value from among the obtained correlation value;
   selecting a delay value corresponding to the maximum correlation value;
   performing infinite impulse response (IIR)-filtering on the selected delay value; and
   applying the filtered delay value to obtain a next correlation value.

6. The method of claim 5, wherein the applying comprises compensating for the delay by applying the filtered delay value to a delay register.

7. The method of claim 5, further comprising:
   obtaining a signal bandwidth with respect to the delay value corresponding to the maximum correlation value; and
   selecting an IIR filter weight based on the signal bandwidth.

8. The method of claim 7, wherein the signal bandwidth comprises a change to at least one of a bandwidth as per a communication system scheme and a bandwidth as per signal assignment.

9. The method of claim 5, wherein the IIR filtering is applied to each of the forward path signal and the reverse path signal of the bidirectional coupler.

10. The method of claim 1, further comprising:
    identifying a cumulative distribution function (CDF) that satisfies a voltage standing wave ratio (VSWR) with respect to an entire antenna impedance region; and
    selecting a number of points in the lookup table based on the CDF and generating the lookup table by using the selected number of points.

11. The method of claim 1, further comprising:
    generating the load impedance by using the load pull tuner; and
    generating the lookup table by estimating the approximate reflection coefficients corresponding to the variation of the load impedance, and an antenna impedance matching parameter that corresponds to maximum transmission power.

12. The method of claim 1, wherein values of respective approximate reflection coefficients are mapped to corresponding impedance matching parameters.

13. An apparatus for matching antenna impedance in a wireless communication system, the apparatus comprising:
    an antenna impedance matching unit; and
    a controller configured to:
      obtain a forward path signal (b3), which is a signal that passes through a bidirectional coupler and transmitted to an antenna, and a reverse path signal (b4), which is a signal that is reflected from the antenna and transmitted to the bidirectional coupler;
      identify a value of a ratio (b4/b3) as an approximate reflection coefficient;
      identify an antenna impedance matching parameter that is mapped to the value of the ratio (b4/b3) of the approximate reflection coefficient in a lookup table obtained by estimating approximate reflection coefficients corresponding to variation of a load impedance that is generated by using a load pull tuner; and
      perform, using the antenna impedance matching unit, antenna impedance matching based on the antenna impedance matching parameter.

14. An apparatus of claim 13, wherein values of respective approximate reflection coefficients are mapped to corresponding impedance matching parameters.

15. An apparatus for matching antenna impedance in a wireless communication system, the apparatus comprising:
    a bidirectional coupler connected to a signal path of an antenna; and
    a controller configured to
      obtain a forward path signal (b3), which is a signal that passes through the bidirectional coupler and transmitted to the antenna, and a reverse path signal (b4), which is a signal that is reflected from the antenna and transmitted to the bidirectional coupler;
      identify a value of a ratio (b4/b3) as an approximate reflection coefficient;
      identify an antenna impedance matching parameter that is mapped to the value of the ratio (b4/b3) of the approximate reflection coefficient in a lookup table obtained by estimating approximate reflection coefficients corresponding to variation of a load impedance that is generated by using a load pull tuner; and
      perform antenna impedance matching based on the antenna impedance matching parameter.

16. The apparatus of claim 15, wherein the controller is further configured to obtain an error of the approximate reflection coefficient due to a delay on an analog front path of the antenna, compensate for the error, determine a delay value corresponding to a maximum correlation value of a received signal with respect to a transmission signal, perform an infinite impulse response (IIR)-filter on the delay value, and obtain a next correlation value by using the filtered delay value.

\* \* \* \* \*